United States Patent
Kamijo et al.

(10) Patent No.: US 10,031,235 B2
(45) Date of Patent: Jul. 24, 2018

(54) POSITION DETECTION DEVICE, POSITION DETECTION SYSTEM, AND POSITION DETECTION METHOD

(71) Applicant: THE FOUNDATION FOR THE PROMOTION OF INDUSTRIAL SCIENCE, Tokyo (JP)

(72) Inventors: Shunsuke Kamijo, Tokyo (JP); Shunsuke Miura, Tokyo (JP)

(73) Assignee: THE FOUNDATION FOR THE PROMOTION OF INDUSTRIAL SCIENCE, Tokyo (JP)

( * ) Notice: Subject to any disclaimer, the term of this patent is extended or adjusted under 35 U.S.C. 154(b) by 311 days.

(21) Appl. No.: 14/892,429

(22) PCT Filed: May 14, 2014

(86) PCT No.: PCT/JP2014/062784
§ 371 (c)(1),
(2) Date: Nov. 19, 2015

(87) PCT Pub. No.: WO2014/188919
PCT Pub. Date: Nov. 27, 2014

(65) Prior Publication Data
US 2016/0146945 A1   May 26, 2016

(30) Foreign Application Priority Data

May 20, 2013 (JP) ................................ 2013-106442
Sep. 3, 2013 (JP) ................................ 2013-182191
(Continued)

(51) Int. Cl.
G01S 19/22 (2010.01)
G01S 19/38 (2010.01)
(Continued)

(52) U.S. Cl.
CPC .............. *G01S 19/22* (2013.01); *G01S 19/24* (2013.01); *G01S 19/428* (2013.01)

(58) Field of Classification Search
CPC .................................. G01S 19/22; G01S 19/24
(Continued)

(56) References Cited

U.S. PATENT DOCUMENTS 7,679,561 B2 * 3/2010 Elwell, Jr. ............ G01C 21/206
342/453
2005/0179591 A1   8/2005 Bertoni et al.
(Continued)

FOREIGN PATENT DOCUMENTS

JP   2000-346655 A   12/2000
JP   2003-501665 A   1/2003
(Continued)

*Primary Examiner* — Dao L Phan
(74) *Attorney, Agent, or Firm* — Bacon & Thomas, PLLC

(57) ABSTRACT

An object is to make it possible to determine and output an accurate current position reliably in a short time and at a low cost, even in environments where signals from positioning satellites are complicatedly affected by structures, geographical features, etc. Therefore, the present invention provides a position detection device comprising: a receiving unit receiving signals from a positioning satellite, and calculating a pseudo range to the positioning satellite based on the signals, and a positioning unit calculating an initial position based on the pseudo range calculated by the receiving unit, calculating the pseudo range to the positioning satellite at plural positions around the initial position using a three-dimensional map data and a ray-tracing method, selecting candidate positions from the plural positions based on the pseudo range, and deciding a current position based on the candidate positions within such a short distance from the initial position that predetermined conditions are satisfied.

34 Claims, 23 Drawing Sheets

(30) Foreign Application Priority Data

Mar. 24, 2014 (JP) ................................ 2014-060084
Mar. 24, 2014 (JP) ................................ 2014-060111

(51) Int. Cl.
*G01S 19/24* (2010.01)
*G01S 19/42* (2010.01)

(58) Field of Classification Search
USPC ............ 342/357.21, 357.25, 357.61, 357.63; 701/468, 469, 478.5
See application file for complete search history.

(56) References Cited

U.S. PATENT DOCUMENTS

2011/0287778 A1* 11/2011 Levin .................... G01S 5/0252
455/456.1
2015/0338522 A1* 11/2015 Miller ................... G01S 19/428
342/357.61

FOREIGN PATENT DOCUMENTS

JP    2010-085290 A    4/2010
JP    2012-503775 A    9/2012

* cited by examiner

FIG. 2
(a)
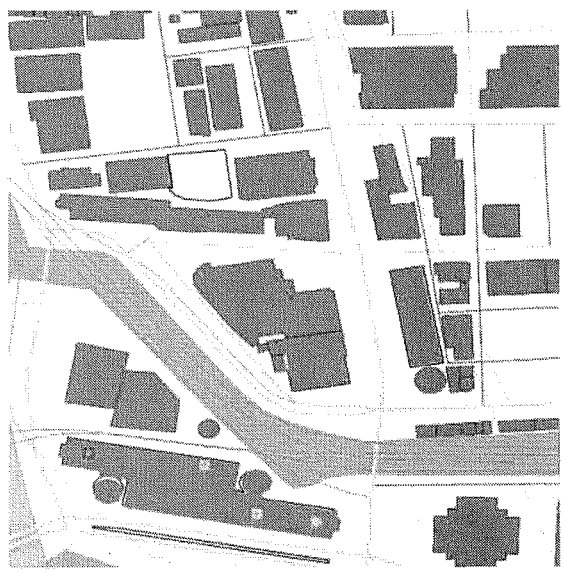
(b)
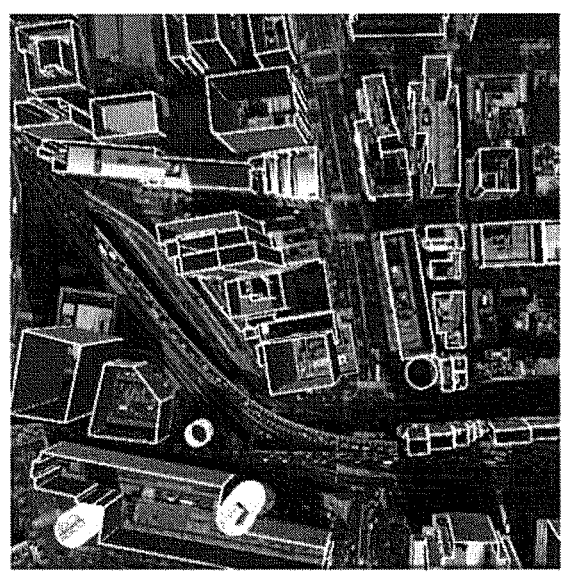

FIG. 4
(a)
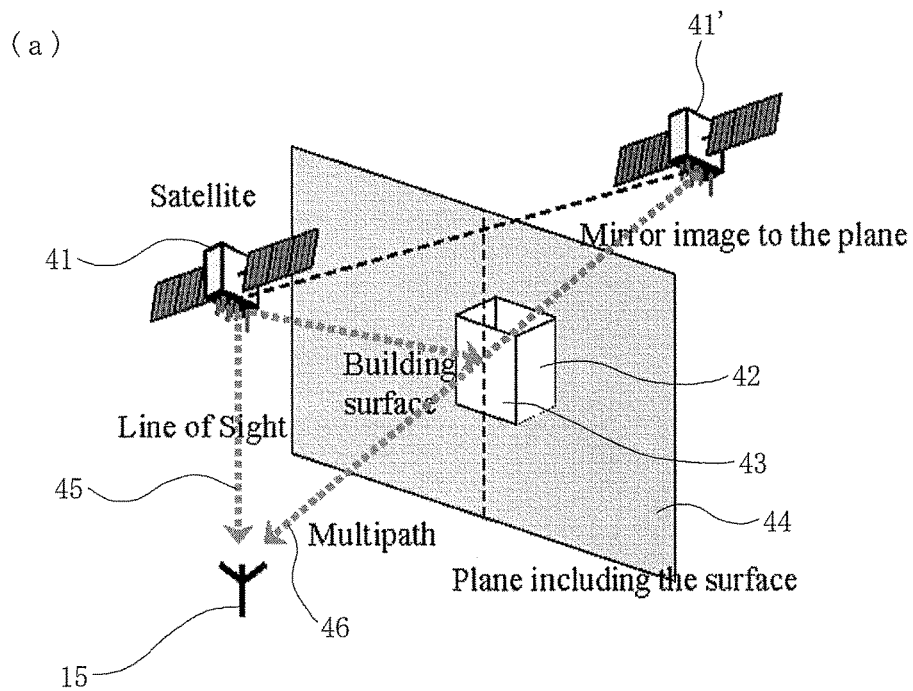
(b)
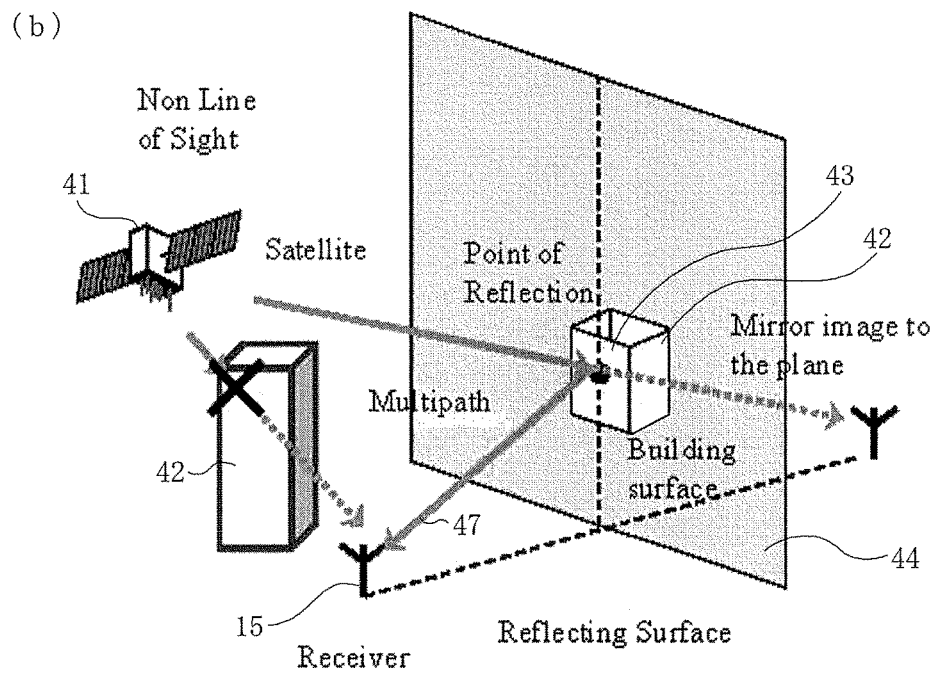

FIG. 9
(a)
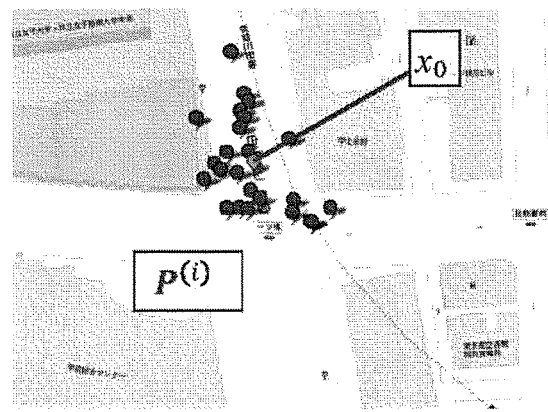
(b)
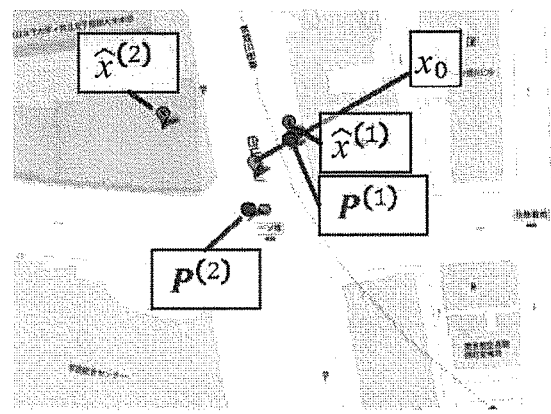
(c)
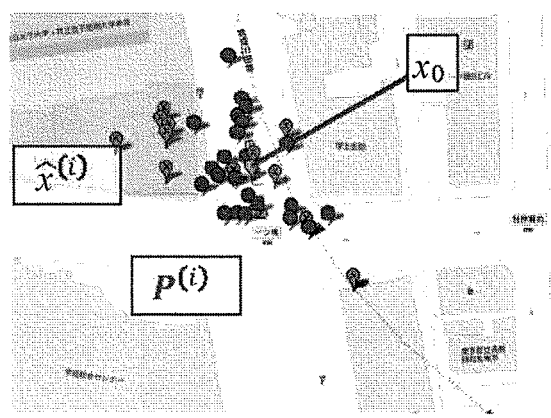

FIG. 11
(a)  (b)
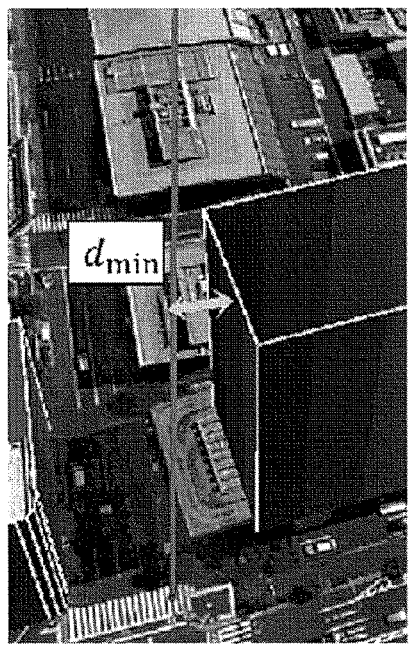 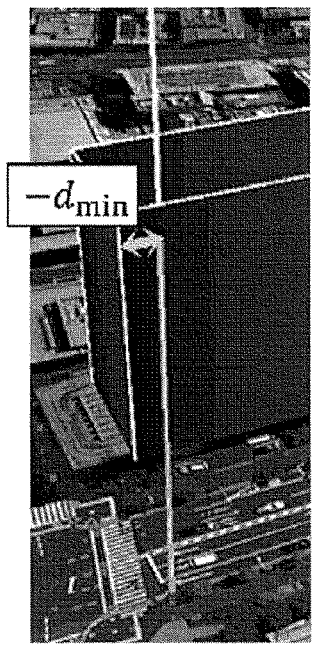

F I G. 1 2
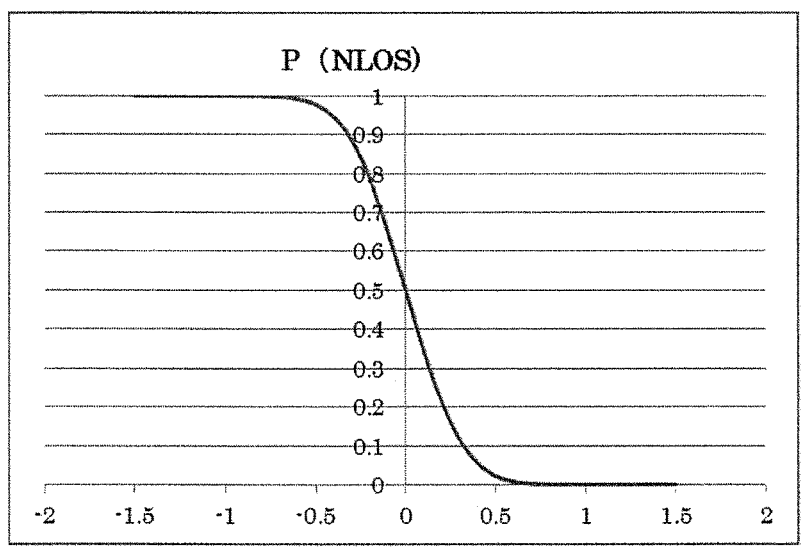

FIG. 16
(a)
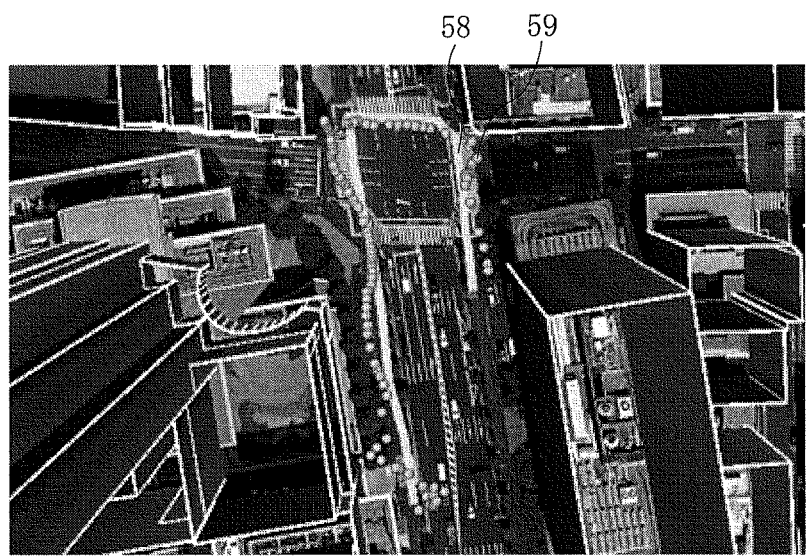
(b)
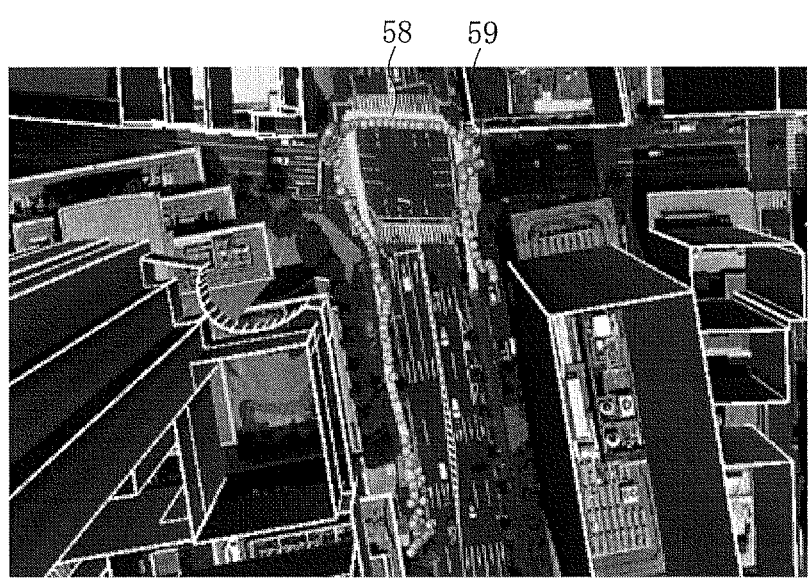

F I G. 1 7 - 2
(a)
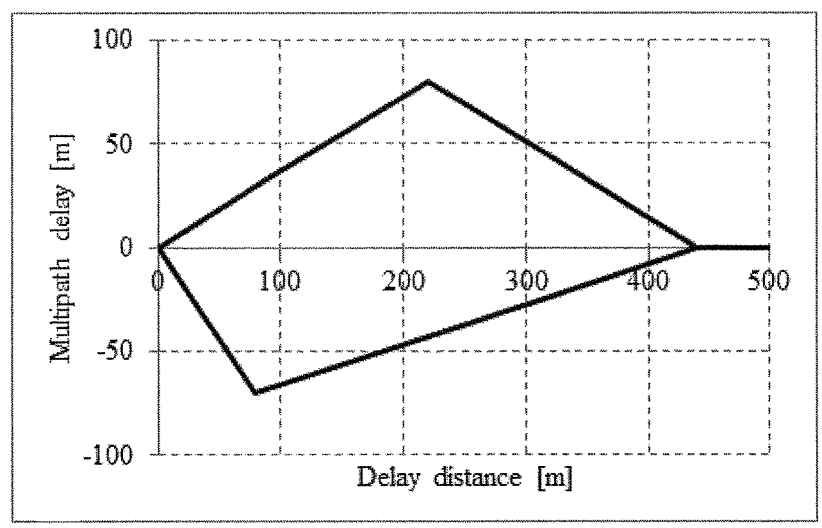
(b)
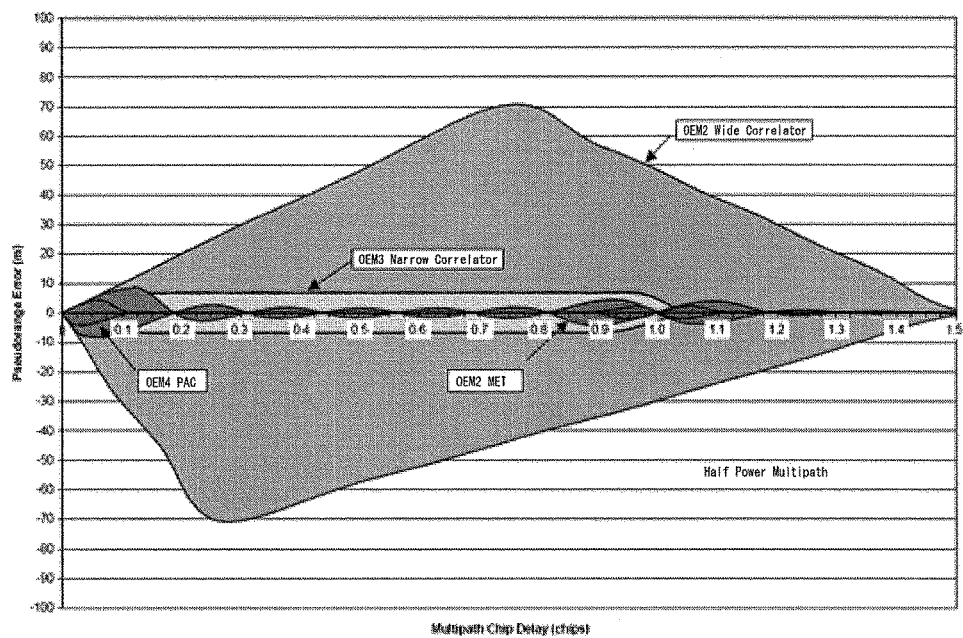

F I G. 1 9
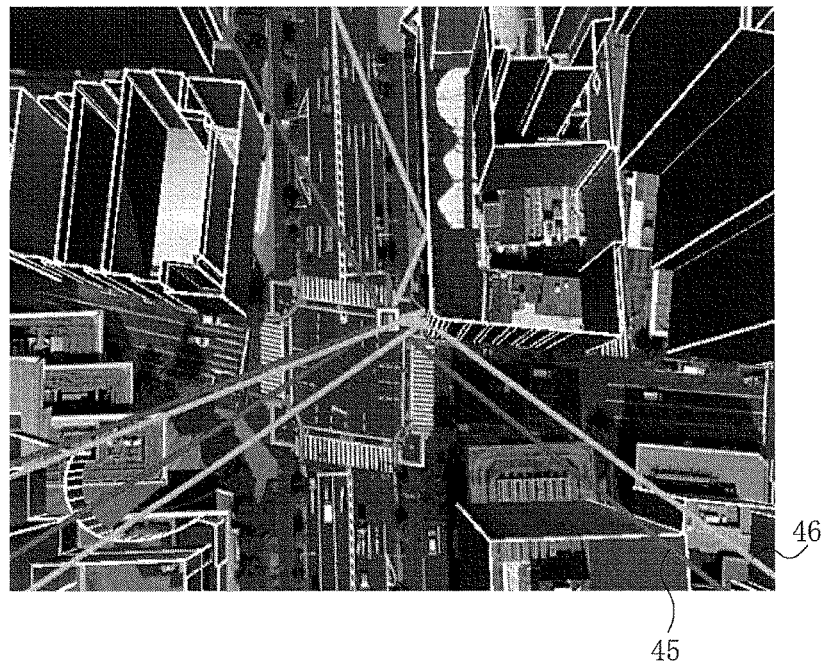

FIG. 20
(a) 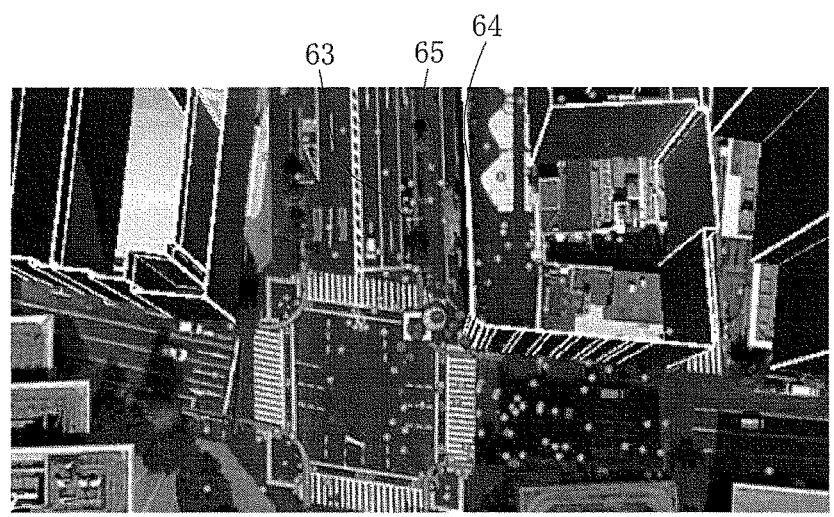
(b) 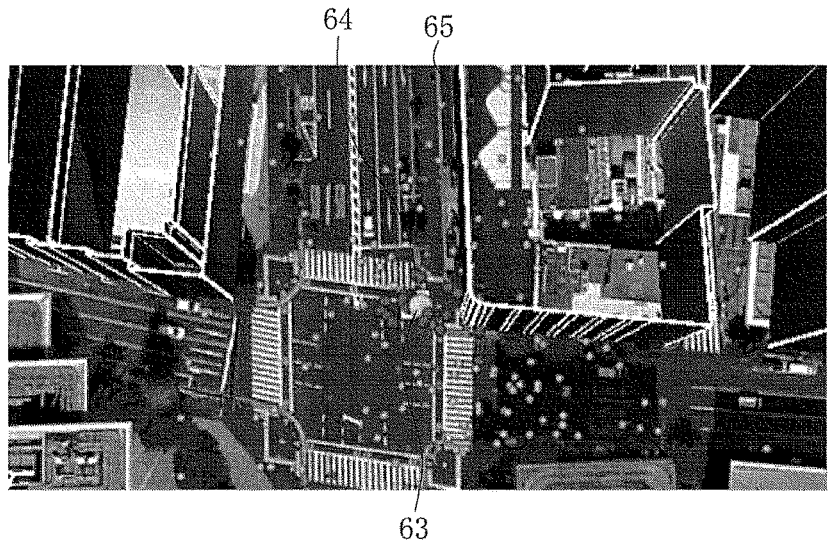

FIG. 22
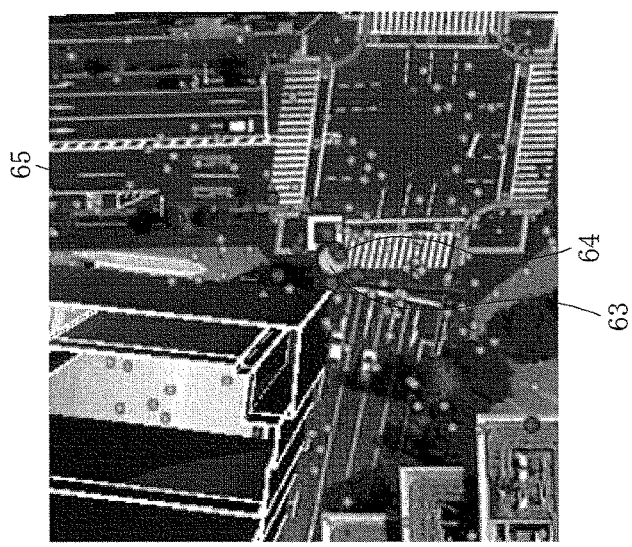
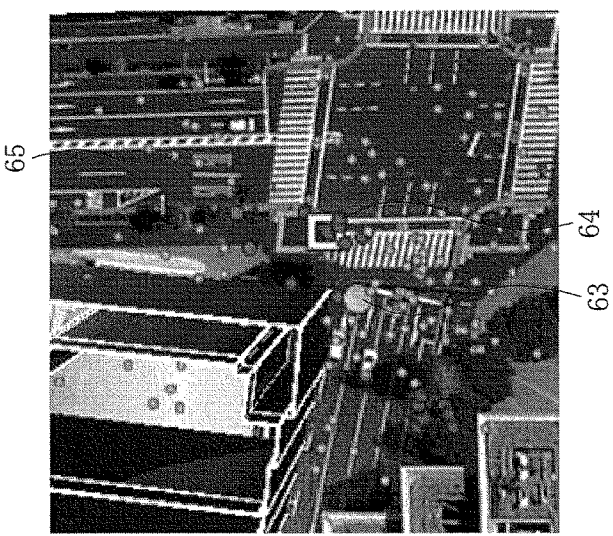

POSITION DETECTION DEVICE, POSITION DETECTION SYSTEM, AND POSITION DETECTION METHOD

TECHNICAL FIELD

The present invention relates to a position detection device, a position detection system, and a position detection method.

BACKGROUND ART

Conventionally, a portable device, such as a vehicle navigation device, a cellular phone and a smart phone, is equipped with a position detection device including a GPS (Global Positioning System) receiver, receives signals from GPS satellites orbiting the earth, detects a current position, and outputs it on a screen or other.

However, when a vehicle or a person with the portable device goes through urban areas or mountainous regions, electromagnetic waves emitted from GPS satellites arrive at the GPS receiver via various paths since the electromagnetic waves are affected by shielding, reflection, diffraction, dispersion or others due to structures such as tall buildings, trees, geographical features, etc. Thus, in urban areas or mountainous regions, the position detection device is not able to output any current position precisely since the GPS receiver is subject to multipath effect.

Then, it has been proposed to compensate the multipath effect in order to supply position detection devices, which are able to output current positions precisely (For example, refer to Patent Documents 1 and 2).

PRIOR ART DOCUMENT

Patent Document

Patent Document 1: Japanese Patent Application Laid-Open (kokai) No. 2005-195493 (JP 2005-195493 A)
Patent Document 2: Japanese Patent Application Laid-Open (kokai) No. 2011-163817 (JP 2011-163817 A)

DISCLOSURE OF THE INVENTION

Problems to be Solved by the Invention

However, the aforementioned conventional position detection devices usually output the current positions detected just based on the signals from GPS satellites, and output the compensated current positions after compensating the detected ones only when the existence of structure causing the multipath becomes clear based on map data. That is, they assume that the current positions detected based on the signals from GPS satellites are generally precise as initial positions, and, if necessary, they compensate the initial positions in order to eliminate the multipath effect.

Therefore they are able to output precise current positions without the multipath effect when passing by one tall building situating in a relatively open area, but not to output any precise current position even after compensating the initial positions when passing through places such as urban canyons with tall buildings, since the electromagnetic waves emitted from GPS satellites are complicatedly affected by numeral tall buildings and any assumption of generally precise initial positions being detected based on the signals from GPS satellites is not granted.

An object of the present invention is to solve the above-mentioned problems of the conventional position detection devices and to provide a position detection device, a position detection system, and a position detection method, which can determine and output stably precise current positions at low cost in a short time even in environments where signals from positioning satellites are complicatedly affected by structures, geographical features, etc.

Means for Solving Problems

Accordingly, the present invention provides a position detection device comprising: a receiving unit receiving signals from a positioning satellite, the receiving unit calculating a pseudo range to the positioning satellite based on the signals, and a positioning unit, the positioning unit calculating an initial position based on the pseudo range calculated by the receiving unit, the positioning unit calculating the pseudo range to the positioning satellite at plural positions around the initial position using a three-dimensional map data and a ray-tracing method, the positioning unit selecting candidate positions from the plural positions based on the pseudo range, and the positioning unit deciding a current position based on the candidate positions within such a short distance from the initial position that predetermined conditions are satisfied.

In another position detection device, the plural positions are lattice points of a mesh set around the initial position, the positioning unit sets the mesh, sets the lattice points as search points, calculates the pseudo range from each of the search points to each positioning satellite, as a search point pseudo range including a NLOS (Non-Line-of-Sight) reflected path delay distance estimated by the three-dimensional map data and the ray-tracing method, calculates a reference position based on the search point pseudo range, and selects, as the candidate positions, the search points of which distance between the reference position and the initial position is equal to a threshold or less.

In yet another position detection device, the positioning unit sets the mesh around the selected candidate position, and repeats setting the search points, calculating the search point pseudo range, calculating the reference position, and selecting the candidate positions.

In yet another position detection device, when the number of the candidate position selected is less than a predetermined number, the positioning unit decides the candidate position of the shortest distance from the initial position as the current position, and, when the number of the candidate position selected is equal to the predetermined number or more, the positioning unit selects again the candidate position of the distance from the initial position equal to the threshold or less, and decides the current position by calculating an average weighted with an inverse of the distance from the initial position with regard to the candidate position selected again.

In yet another position detection device, the plural positions are positions set randomly around the initial position, the positioning unit sets the plural positions as search points, calculates the pseudo range from each of the search points to each positioning satellite, as a search point pseudo range including a NLOS reflected path delay distance estimated by the three-dimensional map data and the ray-tracing method, selects the candidate positions based on the search point pseudo range, adopts a value based on the distance between the candidate position and the initial position as a likelihood, and decides a weighted average corresponding to the likelihood of the candidate position as the current position.

In yet another position detection device, the positioning unit calculates the pseudo range from each search point to each positioning satellite, as a search point pseudo range including a NLOS reflected path delay distance estimated by the three-dimensional map data and the ray-tracing method, and selects, as the candidate positions, the search points of high similarity between a set of the search point pseudo ranges and a set of the pseudo range calculated by the receiving unit.

In yet another position detection device, the positioning unit further adds a similarity between a set of the search point pseudo ranges and a set of the pseudo range calculated by the receiving unit to criteria for selecting the candidate positions.

In yet another position detection device, the positioning unit has a position calculation part calculating the initial position, a circumference search part searching the plural positions, a candidate position selecting part selecting the candidate positions, and a current position deciding part deciding the current position.

In yet another position detection device, in case that a signal propagation from the positioning satellite goes through a fixed range from edges of a structure included in the three-dimensional map data, the position detection device presumes a case that the signal propagation is LOS (Line-of-Sight) and a case that the signal propagation is NLOS, calculates the pseudo range to the positioning satellite in both cases, and selects a likelier one from LOS and NLOS.

In yet another position detection device, in case that a signal propagation from the positioning satellite goes through a fixed range from edges of a structure included in the three-dimensional map data, the position detection device posits an error model on positions of the edges of the structure, and defines a probability that the signal propagation is LOS and a probability that the signal propagation is NLOS.

In yet another position detection device, in case that a residual of least-squares method for calculating the initial position is smaller when presuming that a signal propagation from the positioning satellite is a direct path rather than a reflected path reflected by a structure included in the three-dimensional map data, the position detection device judges that the structure does not exist.

In yet another position detection device, when plural position detection devices judge that the structure does not exist, the judgment is reflected in the three-dimensional map data.

In yet another position detection device, in case that an intensity of received power from the positioning satellite is weak, the position detection device judges whether the signal propagation from the positioning satellite is LOS or NLOS based on a shape of correlation wave outputted by a correlator of the receiving unit.

In yet another position detection device, when symmetric property of the shape of correlation wave is high, the position detection device judges that the signal propagation from the positioning satellite is LOS and an antiphase multipath.

In yet another position detection device, in case that an intensity of received power from the positioning satellite is high, the position detection device judges whether the signal propagation from the positioning satellite is LOS or NLOS using the three-dimensional map data and the ray-tracing method, and, when it is LOS, compensates the pseudo range in consideration of delay.

In yet another position detection device, the position detection device calculates a multipath error according to a delay distance, and compensates the pseudo range with the multipath error.

In yet another position detection device, the position detection device moves coordinates of a wall surface of a structure in a direction perpendicular to the wall surface, in consideration of a possibility of a position error in the direction perpendicular to the wall surface of the structure included in the three-dimensional map data, searches a position where a residual of least-squares method is small, and estimates that the position is the position of wall surface.

The present invention provides a position detection system comprising: a position detection device having a receiving unit receiving signals from a positioning satellite and calculating a pseudo range to the positioning satellite based on the signals, and a server communicatably connected to the position detection device, the server having a positioning unit, the positioning unit calculating an initial position based on the pseudo range calculated by the receiving unit, the positioning unit calculating the pseudo range to the positioning satellite at plural positions around the initial position using a three-dimensional map data and a ray-tracing method, the positioning unit selecting candidate positions from the plural positions based on the pseudo range, and the positioning unit deciding a current position based on the candidate positions within such a short distance from the initial position that predetermined conditions are satisfied, and the server sending the decided current position to the position detection device.

The present invention provides a position detection method comprising: receiving signals from a positioning satellite, calculating a pseudo range to the positioning satellite based on the signals, calculating an initial position based on the pseudo range, calculating the pseudo range to the positioning satellite at plural positions around the initial position using a three-dimensional map data and a ray-tracing method, selecting candidate positions from the plural positions based on the pseudo range, and deciding a current position based on the candidate positions within such a short distance from the initial position that predetermined conditions are satisfied.

The present invention also provides another position detection device comprising: a receiving unit receiving signals from a positioning satellite, the receiving unit calculating a pseudo range to the positioning satellite based on the signals, and a positioning unit, the positioning unit judging whether a signal propagation from the positioning satellite is LOS or NLOS using a three-dimensional map data and a ray-tracing method, the positioning unit, when it is LOS, judging whether it is a multipath including both a direct path and a reflected path or not, the positioning unit, when it is the multipath, compensating the pseudo range calculated by the receiving unit in consideration of delay of the reflected path, and the positioning unit deciding a current position based on the compensated pseudo range.

In yet another position detection device, the positioning unit calculates a multipath error according to a delay distance of the reflected path, and compensates the pseudo range with the multipath error.

In yet another position detection device, the multipath error is calculated based on a model configured corresponding to characteristics of a correlator of the receiving unit.

In yet another position detection device, the positioning unit, when the signal propagation from the positioning satellite is LOS, judges whether it is the multipath or not based on a shape of correlation wave outputted by a correlator of the receiving unit.

In yet another position detection device, the positioning unit calculates an initial position based on the pseudo range calculated by the receiving unit, calculates the pseudo range to the positioning satellite at plural positions around the initial position using the three-dimensional map data and the ray-tracing method, selects candidate positions from the plural positions based on the pseudo range, and decides the current position based on the candidate positions within such a short distance from the initial position that predetermined conditions are satisfied.

In yet another position detection device, the plural positions are lattice points of a mesh set around the initial position, the positioning unit sets the mesh, sets the lattice points as search points, calculates the pseudo range from each of the search points to each the positioning satellite, as a search point pseudo range including a NLOS reflected path delay distance estimated by the three-dimensional map data and the ray-tracing method, calculates a reference position based on the search point pseudo range, and selects, as the candidate positions, the search points of which distance between the reference position and the initial position is equal to a threshold or less.

In yet another position detection device, the positioning unit sets the mesh around the selected candidate position, and repeats setting the search points, calculating the search point pseudo range, calculating the reference position, and selecting the candidate positions.

In yet another position detection device, when the number of the candidate position selected is less than a predetermined number, the positioning unit decides the candidate position of the shortest distance from the initial position as the current position, and, when the number of the candidate position selected is equal to the predetermined number or more, the positioning unit selects again the candidate position of the distance from the initial position equal to the threshold or less, and decides the current position by calculating an average weighted with an inverse of the distance from the initial position with regard to the candidate position selected again.

In yet another position detection device, the plural positions are positions set randomly around the initial position, the positioning unit sets the plural positions as search points, calculates the pseudo range from each of the search points to each the positioning satellite, as a search point pseudo range including a NLOS reflected path delay distance estimated by the three-dimensional map data and the ray-tracing method, selects the candidate positions based on the search point pseudo range, adopts a value based on the distance between the candidate position and the initial position as a likelihood, and decides a weighted average corresponding to the likelihood of the candidate position as the current position.

In yet another position detection device, the positioning unit calculates the pseudo range from each search point to each the positioning satellite, as a search point pseudo range including a NLOS reflected path delay distance estimated by the three-dimensional map data and the ray-tracing method, and selects, as the candidate positions, the search points of high similarity between a set of the search point pseudo ranges and a set of the pseudo range calculated by the receiving unit.

In yet another position detection device, the positioning unit further adds the similarity between a set of the search point pseudo ranges and a set of the pseudo range calculated by the receiving unit to criteria for selecting the candidate positions.

In yet another position detection device, the positioning unit has a position calculation part calculating the initial position, a circumference search part searching the plural positions, a candidate position selecting part selecting the candidate positions, and a current position deciding part deciding the current position.

In yet another position detection device, the position detection device moves coordinates of a wall surface of a structure in a direction perpendicular to the wall surface, in consideration of a possibility of a position error in the direction perpendicular to the wall surface of the structure included in the three-dimensional map data, searches a position where a residual of least-squares method is small, and estimates that the position is the position of wall surface.

In yet another position detection device, in case that a signal propagation from the positioning satellite goes through a fixed range from edges of a structure included in the three-dimensional map data, the position detection device presumes a case that the signal propagation is LOS and a case that the signal propagation is NLOS, calculates the pseudo range to the positioning satellite in both cases, and selects a more likelier one from LOS and NLOS.

In yet another position detection device, in case that a signal propagation from the positioning satellite goes through a fixed range from edges of a structure included in the three-dimensional map data, the position detection device posits an error model on positions of the edges of the structure, and defines a probability that the signal propagation is LOS and a probability that the signal propagation is NLOS.

In yet another position detection device, in case that a residual of least-squares method for calculating the initial position is smaller when presuming that a signal propagation from the positioning satellite is a direct path rather than a reflected path reflected by a structure included in the three-dimensional map data, the position detection device judges that the structure does not exist.

In yet another position detection device, when plural position detection devices judge that the structure does not exist, the judgment is reflected in the three-dimensional map data.

The present invention also provides another position detection system comprising: a position detection device having a receiving unit receiving signals from a positioning satellite and calculating a pseudo range to the positioning satellite based on the signals, and a server communicatably connected to the position detection device, the server having a positioning unit, the positioning unit judging whether a signal propagation from the positioning satellite is LOS or NLOS using a three-dimensional map data and a ray-tracing method, the positioning unit, when it is LOS, judging whether it is a multipath including both a direct path and a reflected path or not, the positioning unit, when it is the multipath, compensating the pseudo range calculated by the receiving unit in consideration of delay, and the positioning unit deciding a current position based on the compensated pseudo range, and the server sending the decided current position to the position detection device.

The present invention also provides another position detection method comprising: receiving signals from a positioning satellite, calculating a pseudo range to the positioning satellite based on the signals, using a three-dimensional map data and a ray-tracing method, judging whether a signal propagation from the positioning satellite is LOS or NLOS, judging whether it is a multipath including both a direct path and a reflected path or not, when it is LOS, compensating the pseudo range calculated by the receiving unit in consideration of delay, when it is the multipath, and deciding a current position based on the compensated pseudo range.

Effects of the Invention

According to the present invention, it is possible to determine and output stably precise current positions at low cost in a short time even in environments where signals from positioning satellites are complicatedly affected by structures, geographical features, etc.

BRIEF DESCRIPTION OF THE DRAWINGS

FIG. 2 is a view showing a three-dimensional map in the first embodiment of the present invention.

FIG. 4 is a set of views explaining a method to detect the multipath in the first embodiment of the present invention, wherein (a) shows a LOS path and (b) shows a NLOS reflected path.

FIG. 9 is a set of views showing search points by the second method in a second embodiment of the present invention, wherein (a)-(c) show a process of setting search points and reference positions.

FIG. 11 is a set of views illustrating a relation between a NLOS path and a LOS path and edges of a structure in a third embodiment of the present invention, wherein (a) shows a case where the path goes outside the structure, and (b) shows a case where the path is interrupted by the structure.

FIG. 12 is a view showing an example of probability of NLOS in a fourth embodiment of the present invention.

FIG. 16 is a set of views showing a locus of current positions detected by considering a possibility of antiphase multipath in the eighth embodiment of the present invention, wherein (a) shows a result of a case not calculating any pseudo range when the positioning satellite is LOS and a received power is equal to a threshold or less and, and (b) shows a result of a case considering the possibility of antiphase multipath when the positioning satellite is LOS and a received power is equal to the threshold or less.

FIG. 17-1 is a set of views showing relations between reflected waves and correlation waves outputted by a correlator in a ninth embodiment of the present invention, wherein (a) shows a case that a reflected wave is in phase, and (b) shows a case that a reflected wave is in antiphase.

FIG. 17-2 is a set of views showing relations between delay distances and multipath errors in the ninth embodiment of the present invention, wherein (a) shows a case of a usual correlator and (b) shows a case of comparing plural types of correlators.

FIG. 19 is a view showing a first example of ray-tracing at a genuine current position in the ninth embodiment of the present invention.

FIG. 20 is a set of views showing a first example of candidate positions in the ninth embodiment of the present invention, wherein (a) shows a case of not considering multipath error $\varepsilon$, and (b) shows a case of considering multipath error $\varepsilon$.

FIG. 22 is a set of views showing a second example of candidate positions in the ninth embodiment of the present invention, wherein (a) shows a case of not considering multipath error $\varepsilon$, and (b) shows a case of considering multipath error $\varepsilon$.

BEST MODES FOR CARRYING OUT THE INVENTION

Embodiments of the present invention will now be described in detail with reference to the drawings.

Figure 1:
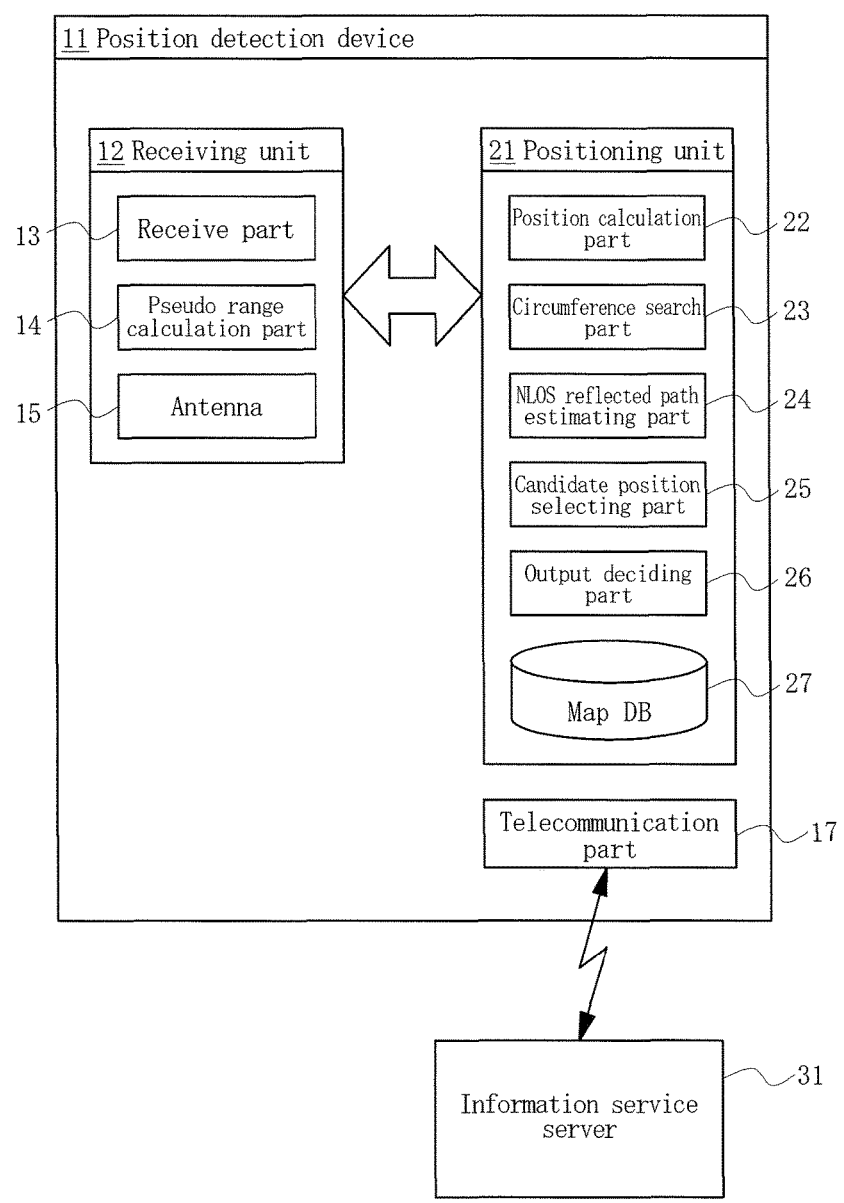
FIG. 1 is a view showing constitution of a position detection system in a first embodiment of the present invention.

FIG. 1 is a view showing constitution of a position detection system in a first embodiment of the present invention. FIG. 2 is a view showing a three-dimensional map in the first embodiment of the present invention. In FIG. 2, (a) shows a two-dimensional map and (b) shows a three-dimensional map corresponding to (a).

In the respective figures, the reference numeral 11 designates a position detection device of a position detection system in the present embodiment, and is communicatably connected with an information service server 31 as a server of the position detection system. The information service server 31 is a computer equipped with a processor such as a CPU or a MPU, a memory device such as a semiconductor memory, a magnetic disk and an optical disc, a telecommunication interface and others, and is installed in an unillustrated information center for distributing a variety of information, such as a map data, a traffic information and weather information.

The position detection device 11 may be any kind of device as long as it is so portable as to be carried about by a human being or a vehicle such as an automobile, and is able to receive signals from a positioning satellite 41 mentioned below, to detect current positions and to output them on screens of display devices or others. It may be a cellular phone, a smart phone, a portable information terminal, a PDA (Personal Digital Assistant), a small personal computer, a wearable computer, a handheld game machine, a navigation device for vehicles, etc. The position detection device 11 is a kind of computer equipped with a processor such as a CPU or a MPU, a memory device such as a semiconductor memory, a display device such as a liquid crystal display, an LED (Light Emitting Diode) display or a CRT (Cathode Ray Tube), an input device such as a keyboard, a joy stick, a cross key, a push button or a touchpanel, a display controller for controlling the display device, and a transmit-receive device such as a telecommunication interface.

From a functional viewpoint, the position detection device 11 is equipped with a receiving unit 12, a positioning unit 21, and a telecommunication part 17, as shown in drawings.

The receiving unit 12 is the same as GPS receivers on the market, for example, and includes a receive part 13 for receiving signals transmitted from positioning satellites 41, a pseudo range calculation part 14 for calculating and outputting pseudo ranges between positions of the positioning satellites 41 and that of the position detection device 11 based on the signals, which are transmitted from all the positioning satellites 41 and received by the receive part 13, and an antenna 15 for receiving the signals transmitted from the positioning satellites 41. The positioning satellites 41 are specifically GPS satellites going around the earth, but may include other ones, such as those of Chinese COMPASS system, of European GALILEO system, and of Japanese Quasi-Zenith satellite system. The receiving unit 12 outputs at a predetermined time interval (e.g. every second) information, such as the positions of the positioning satellites 41 received by the receive part 13 and the pseudo ranges calculated by the pseudo range calculation part 14.

The positioning unit 21 includes a position calculation part 22 for calculating the position of the position detection device 11, a circumference search part 23 for searching a plurality of positions existing around the position calculated by the position calculation part 22, a NLOS reflected path estimating part 24, served as a multipath estimating part, for estimating a delay distance of a NLOS reflected path included in a multipath, which may occur in signal propagation between the position detection device 11 and the positioning satellites 41, a candidate position selecting part 25 for selecting candidate positions based on the positions searched by the circumference search part 23, an output deciding part 26, served as a current position deciding part, for deciding and outputting current positions of the position detection device 11 based on the candidate positions selected by the candidate position selecting part 25, and a map data-base 27 for memorizing and storing map data including three-dimensional map data.

Specifically, the position calculation part 22 calculates the positions of the position detection device 11 using the positions of the positioning satellite 41 outputted by the receiving unit 12 and the pseudo range. The position calculation part 22 also functions as an initial position calculation part and outputs, as an initial position, the position of position detection device 11 it calculated at the beginning. The NLOS reflected path estimating part 24 estimates the delay distance of the NLOS reflected path using the three-dimensional map data and a ray-tracing method. The candidate position selecting part 25 calculates the pseudo ranges at the positions searched by the circumference search part 23 and, based on the pseudo ranges, selects some positions as the candidate positions. The candidate position selecting part 25 may select, as the candidate positions, the positions being within a predetermined distance from the position detection device 11 whose position is calculated by the position calculation part 22. The output deciding part 26 decides and outputs the current positions based on the candidate positions being within the predetermined distance from the position detection device 11 whose position is calculated by the position calculation part 22.

As for the three-dimensional map data, it is desirable to include heights of structures, such as tall buildings. Although such three-dimensional map data may be ones on the market or any kind, the three-dimensional map data explained in this embodiment is the one produced by the inventors of the present invention. Specifically this three-dimensional map data was produced by extracting information of two-dimensional coordinate, including shape of structure and roads from two-dimensional map data, and combining the extracted information with altitude data. As the two-dimensional map data, Open Street Map (OSM) was used and, as a digital surface model, good-3D (R) provided by Aero Asahi Corporation was used. A digital elevation model included data of every 1 [m] mesh in horizontal direction and its accuracy was 50 [cm] in horizontal direction and 15 [cm] in vertical direction.

FIG. 2 (*a*) shows a two-dimensional map of a certain place in Tokyo (specifically, a neighborhood of Hitotsubashi intersection of Hakusan street running along a boundary between Kandanishikicho 3-chome and Hitotsubashi 2-chome, at Chiyoda-ku, Tokyo), and FIG. 2 (*b*) shows a three-dimensional map, corresponding to the two-dimensional map of FIG. 2 (*a*), produced by the inventors of the present invention. This three-dimensional map includes three-dimensional data of structures.

The telecommunication part 17 is the same as telecommunication module on the market, for example, and telecommunicates with an information service server 31 through a wire or wireless telecommunication network, such as a public telecommunication network, a private telecommunication network, a cellular phone network or Internet. The position detection device 11 can acquire varieties of information, e.g. map data such as two-dimensional or three-dimensional map data of an area including the position of the position detection device 11 or of a desired area, traffic information or weather information, through telecommunicating with the information service server 31 via the telecommunication part 17. Therefore, the map data-base 27 does not have to store a lot of map data but only a map data of a required area acquired whenever necessary from the information service server 31. If transmission speed with the information service server 31 is high enough, the map data-base 27 may be omitted. The current position of the position detection device 11 outputted by the positioning unit 21 may be transmitted to the information service server 31. The information service server 31 may be omitted if not necessary.

Next will be described a performance of the position detection device 11 having the above-mentioned structure. First will be described the ray-tracing method using the three-dimensional map data.

Figure 3:
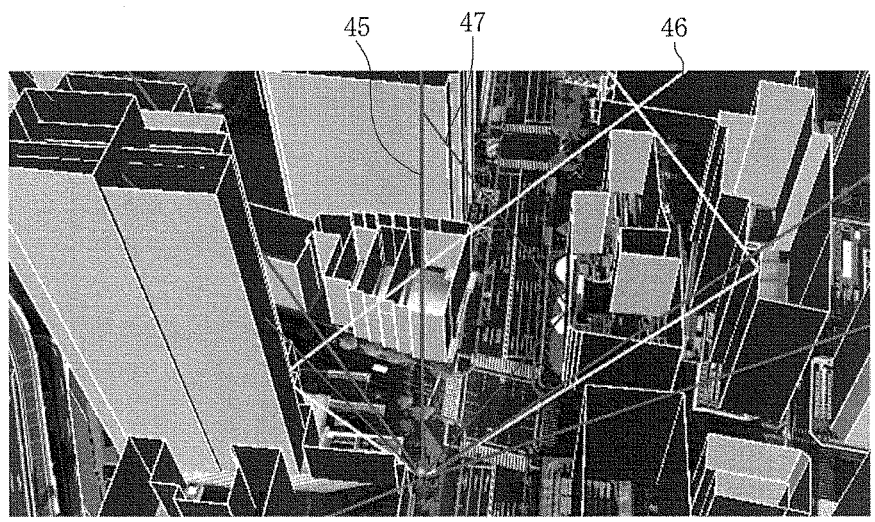
FIG. 3 is a view showing an example of ray-tracing simulation for calculating a multipath in the first embodiment of the present invention.

FIG. 3 is a view showing an example of ray-tracing simulation for calculating a multipath in the first embodiment of the present invention. FIG. 4 is a set of views explaining a method to detect the multipath in the first embodiment of the present invention. In FIG. 4, (a) shows a LOS path and (b) shows a NLOS reflected path.

The ray-tracing method is a technique that was originally used in the field of computer graphics to generate an image of object by tracing a path of light and now is used also to simulate propagation of electromagnetic wave or signal propagation. Then, a technology using the ray-tracing method in order to confirm whether a structure exists between the position detection device 11 and the positioning satellites 41 was already proposed (For example, refer to Non-Patent Document 1).

Non-Patent Document 1: M. Obst, S. Bauer, P. Reisdorf, G. Wanielik, "Multipath detection with 3D digital maps for robust multi-constellation GNSS/INS vehicle localization in urban areas," in Intelligent Vehicles Symposium (IV), 2012 IEEE, pp. 184-190 (2012).

In this embodiment, the simulation of signal propagation from the positioning satellites 41 is performed using the ray-tracing method and the three-dimensional map as shown in FIG. 3. FIG. 3 shows a three-dimensional map of a part of the area shown in FIG. 2. FIG. 4 is a schematic depiction showing a state where a signal propagation from the positioning satellite 41 is reflected on the surface 43 of the building 42, and showing how to detect multipath of signal propagation from the positioning satellite 41.

In drawings, the reference numeral 44 designates a plane including the surface 43 of the building 42, the numeral 41' designates a mirror image of the positioning satellite 41 in the plane 44, the line 45 designates a LOS (Line-of-Sight) path (direct path) which is a signal propagation from a positioning satellite 41 of LOS or a positioning satellite 41 being within vision from the current position of the position detection device 11, the line 46 designates a reflected path or a signal propagation which is emitted from the positioning satellite 41 of LOS and is reflected on the surfaces 43 of the buildings 42, and the line 47 designates a NLOS reflected path or a signal propagation which is emitted from a positioning satellite 41 of NLOS or a positioning satellite 41 being not within vision from the current position of the position detection device 11. There is no direct path as a signal propagation from positioning satellites 41 of NLOS.

The ray-tracing method employed in this embodiment is a method called an imaging method. The surfaces 43 of buildings 42 are assumed to be mirror surfaces and the reflected paths are assumed to follow the law of reflection. In order to find out the multipath of the signal propagation from the positioning satellite 41, the position of the mirror image 41' of the positioning satellite 41 in the surfaces 43 of the buildings 42 is calculated, then it is judged whether a line segment connecting the mirror image 41' and the antenna 15 intersects the surface 43 of the buildings 42. If so, it is examined whether any obstacle exists between the positions of the positioning satellite 41 and the antenna 15 and a reflection point on the surface 43 of the buildings 42. If there is no obstacle, the signal propagation from the positioning satellite 41 is judged as a reflected path. As shown in FIG. 4 (b), if there is an obstacle, such as the buildings 42, between the positions of the positioning satellite 41 and the antenna 15, the signal propagation from the positioning satellite 41 is judged as a NLOS reflected path.

Next will be described a theory of detecting the position of the position detection device 11 using the position of the positioning satellite 41 and the pseudo range. The positioning satellite 41 is assumed as a GPS Satellite.

A simultaneous equation like the following Equation (1) holds for the pseudo range row R between the position of the positioning satellites 41 measured by the receiving unit 12 and the position of the antenna 15 or the receiving unit 12.

$$R = \begin{bmatrix} R_1 \\ R_2 \\ \vdots \\ R_N \end{bmatrix} = \begin{bmatrix} \sqrt{(x_1^{sv} - x^r)^2 + (y_1^{sv} - y^r)^2 + (z_1^{sv} - z^r)^2} + c\delta t^r \\ \sqrt{(x_2^{sv} - x^r)^2 + (y_2^{sv} - y^r)^2 + (z_2^{sv} - z^r)^2} + c\delta t^r \\ \vdots \\ \sqrt{(x_N^{sv} - x^r)^2 + (y_N^{sv} - y^r)^2 + (z_N^{sv} - z^r)^2} + c\delta t^r \end{bmatrix} \quad \text{Equation (1)}$$

When N≥4 or the number of the positioning satellites 41 measured is four or more, Equation (1) is solvable and the position $x^r$ of the antenna 15 or the receiving unit 12 is provided. Specifically, Equation (1) is solved using a method of weighted least squares (least-squares method with weighting). In this embodiment, the position calculation part 22 calculates an initial position $x_0$ by solving Equation (1) using the method of weighted least squares.

$x^r = [x^r, y^r, z^r]^T$ denotes the position of the antenna 15 or the receiving unit 12, $\delta t^r$ denotes a time delay of an unillustrated clock of the receiving unit 12 from GPS time scale, and $x_i^{sv} = [x_i^{sv}, y_i^{sv}, z_i^{sv}]^T$ (i=1, 2, . . . , N) denotes the coordinates of the positioning satellites 41. It is assumed that the coordinates of the positioning satellites 41 as GPS satellites are calculated in advance based on a broadcast ephemeris from the positioning satellites 41.

Next will be described a first method of detecting current positions in consideration of a multipath effect.

Figure 5:
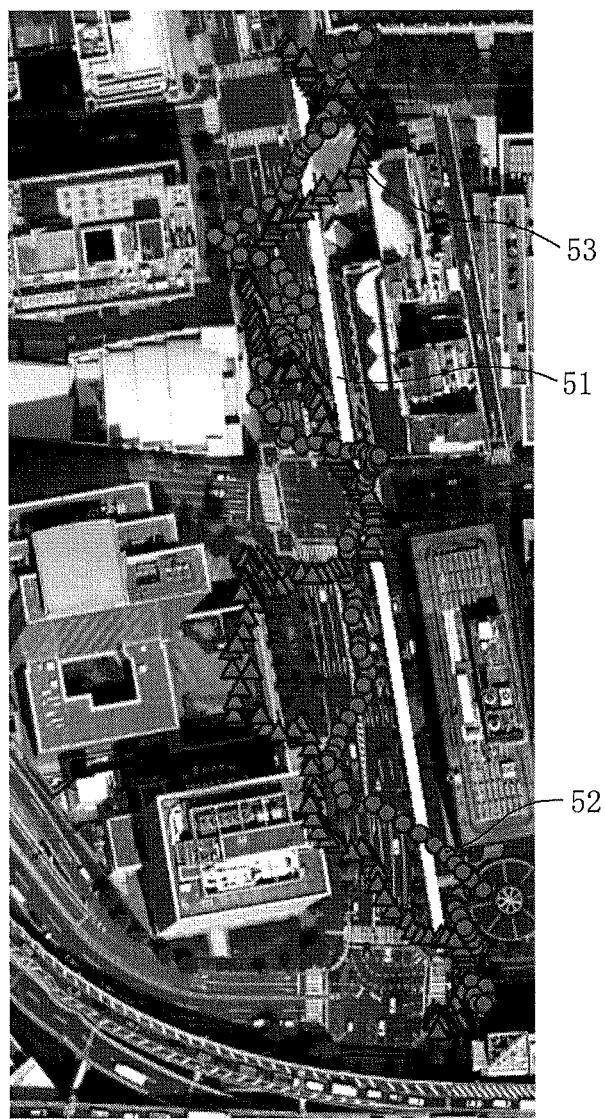
FIG. 5 is a view showing a locus of current positions detected by the first method in the first embodiment of the present invention.

FIG. 5 is a view showing a locus of current positions detected by the first method in the first embodiment of the present invention.

Raw data of the pseudo range is simply derived by multiplying the signal propagation time and the light velocity. Though, the pseudo range has to be corrected, since the signal propagation time includes various errors. The pseudo range $R_n$ calculated regarding a $n^{th}$ positioning satellite 41 is expressed as the following Equation (2).

$$R_n = \rho_n + c(\delta t^r - \delta T_n) + I_n + T_n + \varepsilon_n \quad \text{Equation (2)}$$

In Equation (2), $\rho_n$ denotes a geometric distance to the $n^{th}$ positioning satellite 41, $\delta T_n$ denotes a time delay of a satellite clock from GPS time scale, I denotes a delay distance due to ionosphere, T denotes a delay distance due to troposphere, and ε denotes errors due to multipath, a noise of the receiving unit 12 and a delay of the antenna 15.

The time delay of the satellite clock from GPS time scale is corrected using values calculated based on the broadcast ephemeris. The delay distance due to ionosphere is corrected based on Klobuchar model, and the delay distance due to troposphere is corrected based on Saastamoinen model. The remaining errors are ones due to multipath and the noise of the receiving unit 12.

If the noise is negligibly small, it is apparent that the only error to be removed is one due to multipath or a multipath error. Then, the multipath error is removable by presumption based on a simulation of signal propagation using the ray-tracing method and the three-dimensional map as shown in FIG. 3.

The inventors of the present invention conducted an experiment on detecting positions by the first method at the place shown in FIG. 2. A receiver used for the experiment is a GPS receiver outputing data as shown in Table 1.

|  | Device name | u-blox NEO-6P GPS module |
|---|---|---|
|  | Antenna used | u-blox ANN-MS active GPS antenna with 5-m cable |
| Output data | NMEA 0183 format | Time, Status, Position, Velocity, DOP, etc. |
|  | Navigation Results | position, Velocity, Time DOP, SVs used, etc. |
|  | Receiver Manager Messages | Almanach, Ephemeris, Satellite Status, etc. |
|  | Raw Measurement Data | GPS time, GPS week number, Pseudorange, Doppler, Signal strength C/No, etc. |

FIG. 5 shows experimental results plotted on a map. The map shown in FIG. 5 is a three-dimensional map expanding and showing a vicinity of the street extending up and down slantingly through the central area in the width direction of FIG. 2. In FIG. 5, a thick white straight line 51 shows an actual path along which the inventors moved on the street with the GPS receiver. A plurality of round marks 52 shows a locus of positions detected by the first method based on the output of the GPS receiver. A plurality of triangular marks 53 shows a locus of positions outputted by the GPS receiver.

The output of the GPS receiver is supposed to be filtered in order to smooth the locus. Therefore, in this experiment, a particle filter was applied to the positions detected by the first method.

As clearly illustrated in FIG. 5, the locus shown by round marks 52 and that shown by triangular marks 53 indicate not an identical but a similar nature regarding magnitude, tendency or others of error.

Next will be described a second method of detecting current positions in consideration of the multipath effect.

Figure 6:
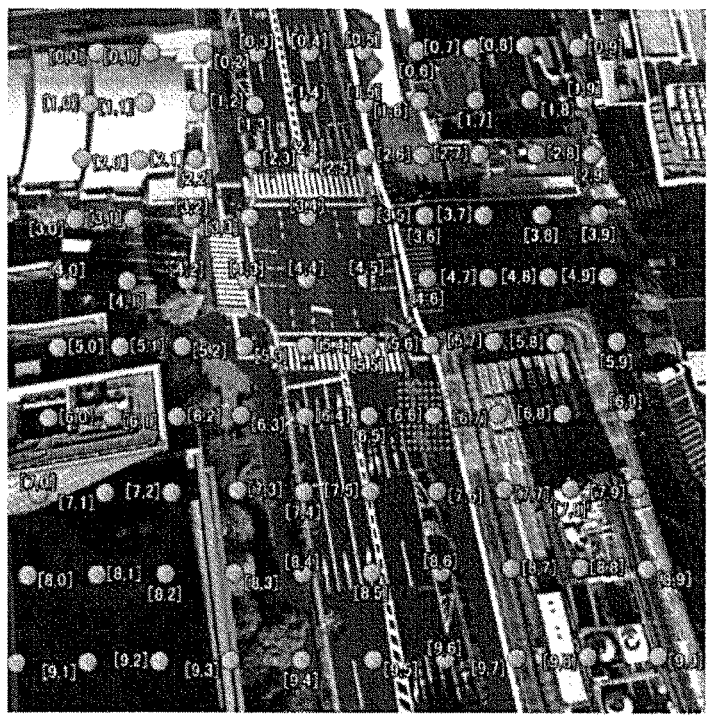
FIG. 6 is a view showing lattice points of a first mesh by the second method in the first embodiment of the present invention.
Figure 7:
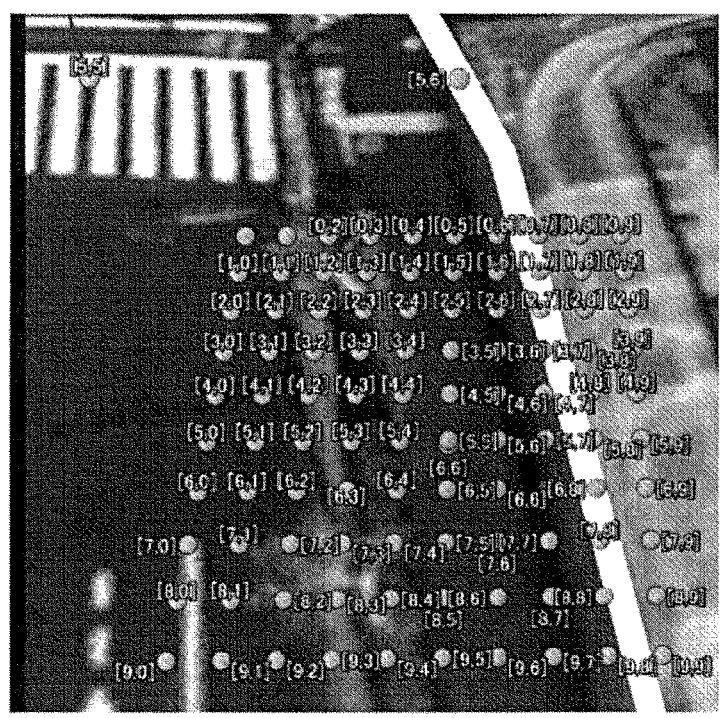
FIG. 7 is a view showing lattice points of a second mesh by the second method in the first embodiment of the present invention.
Figure 8:
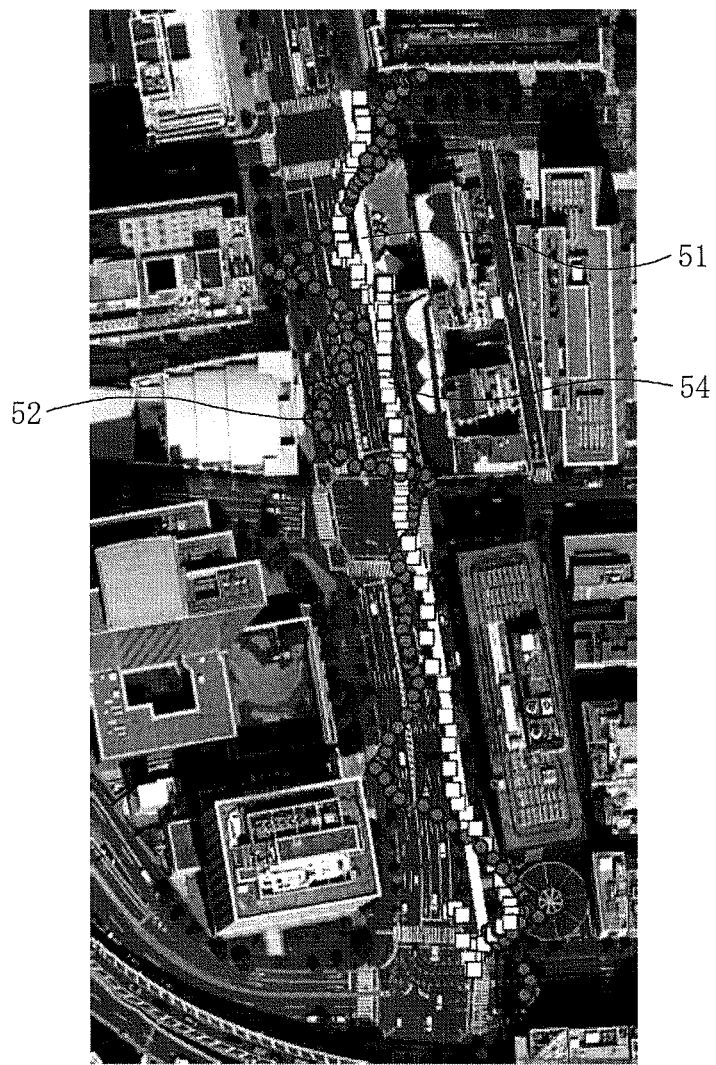
FIG. 8 is a view showing a locus of current positions detected by the second method in the first embodiment of the present invention.

FIG. 6 is a view showing lattice points of a first mesh by the second method in the first embodiment of the present invention. FIG. 7 is a view showing lattice points of a second mesh by the second method in the first embodiment of the present invention. FIG. 8 is a view showing a locus of current positions detected by the second method in the first embodiment of the present invention.

The second method is as follows: setting a position detected by solving Equation (1) as an initial position; calculating pseudo ranges at a plural positions surrounding the initial position; setting positions detected based on the pseudo ranges as candidate positions; and detecting a current position based on the candidate positions within a distance of predetermined value from the initial position. The position detection device 11 in this embodiment detects the current position by the second method.

First, the position calculation part 22 calculates and sets the position of the position detection device 11, using the positions of the positioning satellites 41 and the pseudo ranges outputted at a predetermined time interval by the receiving unit 12. Specifically, the position calculation part 22 uses the pseudo range row R outputted at a predetermined time interval by the receiving unit 12 and, by solving Equation (1) using the method of weighted least squares at each time when coordinates of the positioning satellite 41 or the satellite position $x_i^{sv}$ is received, calculates the position $x^r$ of antenna 15 or the receiving unit 12 to set up it as an initial position $X_0$.

Then, the circumference search part 23 searches a plurality of positions around the position set by the position calculation part 22. Because the genuine position of the position detection device 11 is supposed to be within a range not far from the initial position $x_0$ or in some vicinity of it. Specifically, the circumference search part 23 sets up a first lattice or mesh, such as a 10 [m] mesh with 10×10 lattice points, in a first area, such as an area of 100 [m]×100 [m], around the initial position $x_0$, and makes each lattice point a first search point $P^{(1)}(i,j)$. FIG. 6 shows an example of the first search points $P^{(1)}(i,j)$ plotted on a map. The map in FIG. 6 is a three-dimensional map expanding a vicinity of a crossing in the near-center of FIG. 5.

And, according to following Equation (3), the candidate position selecting part 25 calculates a first pseudo range row $\hat{R}(i,j)$, as a search point pseudo range, on all the first search points $P^{(1)}(i,j)$ ($0 \le i,j \le 10$).

$$\hat{R}(i,j) = \begin{bmatrix} \hat{R}_1(i,j) \\ \hat{R}_2(i,j) \\ \vdots \\ \hat{R}_N(i,j) \end{bmatrix} = $$

$$\rho(i,j) + c(\delta t^r - \delta T) + I + T + \varepsilon^{multipath}(i,j)$$

Equation (3)

In Equation (3), $\rho(i,j)$ denotes a geometric distance from the first search points $P^{(1)}(i,j)$ to the positioning satellites 41, and $\varepsilon^{multipath}(i,j)$ denotes a multipath delay distance including a NLOS reflected path delay distance which may occur in the signal propagations from the first search points $P^{(1)}(i,j)$ to each positioning satellite 41. The NLOS reflected path estimating part 24 estimates the multipath delay distance $\varepsilon^{multipath}(i,j)$ using the ray-tracing method and the three-dimensional map data.

Then, the position calculation part 22 solves Equation (1) using a weighted least squares method with the first pseudo range row $\hat{R}(i,j)$ and the satellite positions $x_i^{sv}$, thereby calculates a position $\hat{x}(i,j)$ and sets up it a first reference position. Since the first pseudo range row $\hat{R}(i,j)$ potentially includes multipath errors including the delay distance of the NLOS reflected path, the calculated first reference position $\hat{x}(i,j)$ may be considerably far from the first search points $P^{(1)}(i,j)$. Then, if an air clearance between the initial position $x_0$ and the first reference position $\hat{x}(i,j)$ is narrow enough, it is assumed that the first search point $P^{(1)}(i,j)$ is located at the genuine current position. And the candidate position selecting part 25 selects particular first search point $P^{(1)}(i,j)$ as a first candidate position on such a condition that a first air clearance $\|x_0 - \hat{x}(i,j)\|$, the air clearance between the initial position $x_0$ and the first reference position $\hat{x}(i,j)$ regarding the particular first search point $P^{(1)}(i,j)$, is equal to a first threshold (e.g., about 30-50 [m]) or less.

Then, the circumference search part 23 searches a plurality of positions around the first search point $P^{(1)}(i,j)$ selected as the first candidate position. Specifically, the circumference search part 23 sets up a second mesh, such as a 1 [m] mesh with 10×10 lattice points, in a second area, such as an area of 10 [m]×10 [m], around the first search point $P^{(1)}(i,j)$ selected as the first candidate position, and makes each lattice point a second search point $P^{(2)}(i, j, k, l)$. FIG. 7 shows an example of the second search points $P^{(2)}(i, j, k, l)$ plotted on a map. The map in FIG. 7 is a three-dimensional map expanding a vicinity of the near-center of FIG. 6.

And, according to Equation (3), the candidate position selecting part 25 calculates a second pseudo range row $\hat{R}(i, j, k, l)$, as the search point pseudo range, on all the second search point $P^{(2)}(i, j, k, l)$ ($0 \le i, j, k, l \le 10$). In this embodiment, the second pseudo range row $\hat{R}(i, j, k, l)$ will be calculated only when following conditions (1)-(4) are satisfied, based on compatibility with the visibility of the positioning satellites 41 estimated from the intensity of received power.

(1) In case that the received power from the positioning satellite 41 is large enough, any second pseudo range row $\hat{R}(i, j, k, l)$ is not calculated on the second search point $P^{(2)}(i, j, k, l)$ inside the buildings 42.

(2) In case that the positioning satellite 41 is recognized as NLOS but any path reflected just once is not found or that the NLOS reflected path includes multiple reflection or diffraction, the second pseudo range row $\hat{R}(i, j, k, l)$ to the positioning satellite 41 concerned is not calculated.

(3) In case that the positioning satellite 41, the received power from which is equal to a predetermined threshold or more, is recognized as NLOS, any second pseudo range row $\hat{R}(i, j, k, l)$ is not calculated on the second search point $P^{(2)}(i, j, k, l)$ concerned. The predetermined threshold is determined based on the average of the past received power.

(4) In case that the positioning satellite 41, the received power from which is equal to the predetermined threshold or less, is recognized as LOS, any second pseudo range row $\hat{R}(i, j, k, l)$ is not calculated on the second search point $P^{(2)}(i, j, k, l)$ concerned.

Then, the position calculation part 22 solves Equation (1) using a weighted least squares method with the second pseudo range row $\hat{R}(i, j, k, l)$ and the satellite positions $x_i^{sv}$, thereby calculates a position $\hat{x}(i, j, k, l)$ and sets up it as a second reference position.

Then, according to following (5) or (6), the output deciding part 26 decides an output position $x^r$ and sets up it as the current position of the position detection device 11.

(5) The candidate position selecting part 25 selects particular second search point $P^{(2)}(i, j, k, l)$ as a second candidate position on such a condition that a second air clearance $d=\|x_0-\hat{x}(i, j, k, l)\|$, the air clearance between the initial position $x_0$ and the second reference position $\hat{x}(i, j, k, l)$ regarding the particular second search point $P^{(2)}(i, j, k, l)$, is minimum. Then, the output deciding part 26 decides the second candidate position as the output position $x^r$. That is, the output position $x^r$ is decided as following Equation (4).

$$\exists (i, j, k, l) \text{ s.t. } \min_{i,j,k,l} d \Rightarrow x^r = P^{(2)}(i, j, k, l) \qquad \text{Equation (4)}$$

(6) The candidate position selecting part 25 selects the particular second search point $P^{(2)}(i, j, k, l)$ as a second candidate position on such a condition that a second air clearance $d=\|x_0-\hat{x}(i, j, k, l)\|$, the air clearance between the initial position $x_0$ and the second reference position $\hat{x}(i, j, k, l)$ regarding the particular second search point $P^{(2)}(i, j, k, l)$, is not more than a second threshold (e.g., about 30-50 [m]). Then, the output deciding part 26 calculates an average, which is weighted by the reciprocal of the second air clearance d, of all the second search points $P^{(2)}(i, j, k, l)$ selected as the second candidate positions, and decides it as the output position $x^r$. That is, the output position $x^r$ is decided as following Equation (5).

$$x^r = \left[\sum_{d < Threshold} \frac{P^{(2)}(i, j, k, l)}{d}\right] / \left[\sum_{d < Threshold} \frac{1}{d}\right] \qquad \text{Equation (5)}$$

In a case that the number of the second reference positions $\hat{x}(i, j, k, l)$ is less than a predetermined number (for example, 10), it is desirable to decide the output position $x^r$ according to the above (5), and in a case that the number of the second reference positions $\hat{x}(i, j, k, l)$ is equal to the predetermined number or more, it is desirable to decide the output position $x^r$ according to the above (6).

Then, the output deciding part 26 applies the particle filter to the decided output positions $x^r$ so that the locus of the output positions $x^r$ becomes smooth, and outputs the obtained results. A model in the particle filter is as follows.

A state vector is defined as $x^r=[\varphi,\lambda]^T$ indicating values of latitude and longitude, and a value observation vector is assumed as $y^r=[\varphi, \lambda, v\varphi, v\lambda]^T$ considering velocity. A transition model is expressed as following Equation (6), and a transition matrix is expressed as following Equation (7). A likelihood function regarding each particle is expressed as following Equation (8).

$$y_t^r = F y_{t-1}^r + v_t \qquad \text{Equation (6)}$$

$$F = \begin{bmatrix} 1 & 0 & \Delta t & 0 \\ 0 & 1 & 0 & \Delta t \\ 0 & 0 & 1 & 0 \\ 0 & 0 & 0 & 1 \end{bmatrix} \qquad \text{Equation (7)}$$

$$\pi_t^{(i)} = \qquad \text{Equation (8)}$$

$$L(x_t \mid y_t = s_{t|t-1}^{(i)}) = \frac{\left[(\varphi_{x_t} - \varphi_{s_t^{(i)}})^2 - (\lambda_{x_t} - \lambda_{s_t^{(i)}})^2\right]^{-\frac{1}{2}}}{\sum_{i}^{N_p} \left[(\varphi_{x_t} - \varphi_{s_t^{(i)}})^2 - (\lambda_{x_t} - \lambda_{s_t^{(i)}})^2\right]^{-\frac{1}{2}}}$$

FIG. 8 shows the output positions outputted by the output deciding part 26 or the current positions of the position detection device 11 plotted on a map. The map shown in FIG. 8 is a three-dimensional map showing the almost same range as FIG. 5. In FIG. 8, a thick white straight line 51 shows an actual path along which the inventors moved on the street with the position detection device 11. A plurality of square marks 54 shows a locus of the current positions of the position detection device 11 outputted by the output deciding part 26. A plurality of round marks 52 shows, as a reference, a locus of the positions detected by the first method. The square marks 54 and the round marks 52 are obtained by applying the particle filter.

As clearly illustrated in FIG. 8, the locus shown by the square marks 54 is observed close to the actual path comparing to that shown by the round marks 52.

In this embodiment, explained is an example, wherein the lattice points of the first mesh set around the initial position are set up as the first search points, particular first search points are selected as the first candidate positions on such a condition that the air clearance between the initial position and the first reference position calculated based on the particular first search point is equal to the first threshold or less, the lattice points of the second mesh set around the first candidate positions are selected as the second search points, particular second search points are selected as the second candidate positions on such a condition that the air clearance between the initial position and the second reference position calculated based on the particular second search point is equal to the second threshold or less, and the output position is decided based on the second candidate positions. However, it is possible to decide the output position based on the first candidate positions without obtaining the second candidate positions. In other words, the process comprising of setting a mesh, of setting up lattice points of the mesh as search points, and of selecting candidate positions from the search points, does not necessarily need to be repeated twice. The process may be performed just once or may be repeated more than twice if necessarily. That is, the process comprising of setting a mesh, of setting up lattice points of the mesh as search points, and of selecting candidate positions from the search points may be performed once or plural times repeatedly.

Application of a particle filter is omissible properly. Filters (e.g., Kalman filter etc.) other than a particle filter are also applicable.

As described above, according to the present embodiment, the position detection device 11 comprises the receiving unit 12, which receives the signals transmitted from the positioning satellites 41 and calculates the pseudo ranges to the positioning satellites 41 based on the received signals, and the positioning unit 21, which calculates the initial position based on the pseudo ranges calculated by the receiving unit 12, calculates the pseudo ranges from plural positions around the initial position to the positioning satellites 41 using the three-dimensional map data and the ray-tracing method, selects candidate positions from the plural positions based on the calculated pseudo ranges, and decides the current position based on the candidate positions of so close distance from the initial position that the predetermined conditions are satisfied.

And, the position detection method comprises receiving the signals from the positioning satellites 41, calculating the pseudo ranges to the positioning satellite 41 based on the received signals, calculating the initial position based on the calculated pseudo ranges, calculating the pseudo ranges from plural positions around the initial position to the positioning satellites 41 using the three-dimensional map data and the ray-tracing method, selecting candidate positions from the plural positions based on the calculated pseudo ranges, and deciding the current position based on the candidate positions of so close distance from the initial position that the predetermined conditions are satisfied.

Thereby, it is possible to determine and to output stably the precise current positions at low cost in a short time, with eliminating appropriately the effect of multipath, such as NLOS reflected path, even in environments where signals from the positioning satellites 41 are complicatedly affected by structures, geographical features, etc.

Further, the plural positions are the lattice points of the mesh set around the initial position, and the positioning unit 21 sets the mesh, makes the lattice points of the mesh into the search points, calculates the search point pseudo range, which is the pseudo range from each of the search points to each of the positioning satellites 41 and includes the NLOS reflected path delay distance estimated by the three-dimensional map data and the ray-tracing method, calculates the reference position based on the calculated search point pseudo range, and selects particular search point as the candidate position on such a condition that, regarding the particular search point, the distance between the calculated reference position and the initial position is equal to the threshold or less. Thereby, even in a case that any assumption of generally precise initial positions calculated on the basis of the pseudo range calculated by the receiving unit 12 is not granted, it is possible to decide the current position based on the candidate position selected from the search points set around the initial position, so that an accurate current position is able to be determined and outputted.

Further, the positioning unit 21 sets the mesh around the selected candidate position, and repeats setting the search points, calculating the search point pseudo range, calculating the reference position, and selecting the candidate position. Thus the process comprising setting the mesh, making the lattice points of the mesh into the search points, and selecting the candidate position from the search points is repeated more than once, so more appropriate candidate positions are able to be selected and a more accurate current position is able to be determined and outputted.

Further, when the number of the selected candidate positions is less than a predetermined one, the positioning unit 21 decides the candidate positions of the minimum distance from the initial position as the current position and, when the number of the selected candidate positions is equal to a predetermined one or more, the positioning unit 21 selects again the candidate positions of distance equal to the threshold or less from the initial position, and decides the current position by calculating an average, which is weighted by the reciprocal of the distance from the initial position, regarding the again selected candidate positions. Thereby, the current position is able to be determined accurately.

Further, the positioning unit 21 outputs the result obtained by applying the particle filter to the decided current position. Thereby, the smooth locus of the current positions is able to be obtained.

Next will be described a second embodiment of the present invention. Structural features similar to the first embodiment are denoted by common reference numerals, and repeated description of operation and effects similar to those of the first embodiment is omitted.

Figure 10:
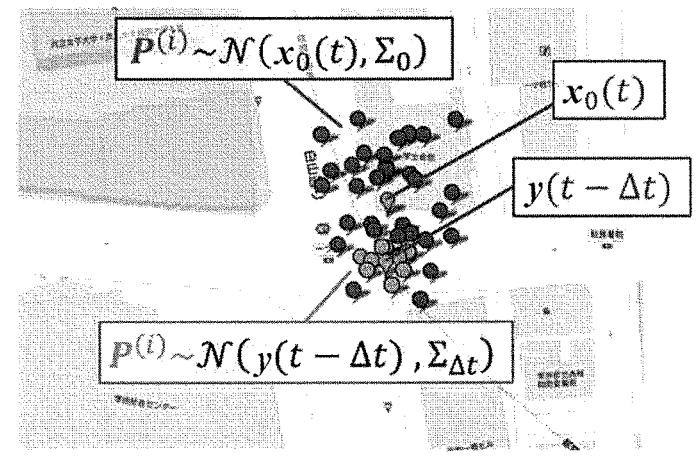
FIG. 10 is a view showing an example of distribution of particle when applying a particle filter by the second method in the second embodiment of the present invention.

FIG. 9 is a set of views showing search points by the second method in a second embodiment of the present invention. FIG. 10 is a view showing an example of distribution of particle when applying a particle filter by the second method in the second embodiment of the present invention. In FIG. 9, (a)-(c) show a process of setting search points and reference positions.

In this embodiment, the second method of detecting current position in consideration of the multipath effect is the same as that of the first embodiment with regard to the following point: both are the method comprising making a position detected by solving Equation (1) as the initial position, calculating the pseudo ranges at plural positions around the initial position, setting up the positions detected based on the pseudo ranges as the candidate positions, and detecting the current position based on the candidate positions of the lesser than predetermined distance from the initial position. Though, they are different in the point that the plural positions around the initial position are set randomly in this embodiment, while they are the lattice points of the mesh set in the first embodiment.

The structure of the position detection device 11 and the first method of detecting current positions in consideration of the multipath effect are similar to those of the first embodiment, therefore repeated description about them is omitted.

In this embodiment, the position calculation part 22, as well as in the first embodiment, calculates and sets the position of the position detection device 11, using the positions of the positioning satellites 41 and the pseudo ranges outputted at a predetermined time interval by the receiving unit 12. Specifically, the position calculation part 22 uses the pseudo range row R outputted at a predetermined time interval by the receiving unit 12 and solves Equation (1) using the method of weighted least squares at each time when receiving coordinates of the positioning satellite 41 or the satellite positions $x_i^{sv}$. Thereby, the position $x^r$ of antenna 15 or receiving unit 12 is calculated and is set up as an initial position $x_0$.

Then, the circumference search part 23 searches a plurality of positions around the position set by the position calculation part 22. Specifically, the circumference search part 23 sets search points $P^{(i)}$ around the initial position $x_0$ at random. FIG. 9(a) shows an example of the initial position $x_0$ and the search points $P^{(1)}$ plotted on a map. The map shown in FIGS. 9(a)-(c) is a two-dimensional map expanding a vicinity of a crossing in the near-center of FIG. 5, and is provided by ZENRIN CO. as Google Map.

And, according to Equation (3), the candidate position selecting part 25 calculates a pseudo range row $\hat{R}^{(i)}$ as the search point pseudo range, on all the search points $P^{(i)}$. The NLOS reflected path estimating part 24, as well as the first embodiment, estimates the multipath delay distance $\varepsilon^{multi}_{path}$, which includes a NLOS reflected path delay distance, using the ray-tracing method and the three-dimensional map data.

Then, the position calculation part 22 solves Equation (1) using a weighted least squares method with the pseudo range row $\hat{R}^{(i)}$ and the satellite positions $x_i^{sv}$, thereby calculates a position $\hat{x}^{(i)}$ and sets up it as a reference position. FIG. 9 (*b*) shows an example of reference positions $\hat{x}^{(i)}$ calculated about two of the search points $P^{(i)}$ shown in FIG. 9 (*a*), and FIG. 9 (*c*) shows an example of reference positions $\hat{x}^{(i)}$ calculated about all of the search points $P^{(i)}$ shown in FIG. 9 (*a*).

Since the pseudo range row $\hat{R}^{(i)}$ potentially includes multipath errors including the delay distance of the NLOS reflected path, the calculated reference position $\hat{x}^{(i)}$ may be considerably far from the search points $P^{(i)}$. So, as shown in FIG. 9 (*b*), the reference position $\hat{x}^{(i)}$ may appear near the search points $P^{(i)}$, or may appear far away from the search points $P^{(i)}$. Assuming that the search point $P^{(i)}$ is located at the genuine current position, the pseudo range row $\hat{R}^{(i)}$ would be subject to the effect of the multipath including a NLOS reflected path delay distance, as well as the pseudo range row R detected by the receiving unit 12, and the reference position $\hat{x}^{(i)}$ would be calculated to be near the initial position $x_0$. So, the candidate position selecting part 25 considers the air clearance $\|x_0 - \hat{x}^{(i)}\|$, which is the air clearance between the initial position $x_0$ and the reference position $\hat{x}^{(i)}$, as a likelihood of the search point $P^{(i)}$.

The candidate position selecting part 25 searches the search points $P^{(i)}$ for a candidate for the genuine current position according to judgment whether the search points $P^{(i)}$ satisfy the following conditions (1')-(4') similar to the conditions (1)-(4) explained in the first embodiment, based on compatibility with the visibility of the positioning satellites 41 estimated from the intensity of received power, and calculates the pseudo range rows $\hat{R}^{(i)}$.

(1') In case that the received power from the positioning satellite 41 is large enough, any search point $P^{(i)}$ inside of buildings 42 is not employed.

(2') In case that the positioning satellite 41 is recognized as NLOS but any path reflected just once is not found or that the NLOS reflected path includes multiple reflection or diffraction, the positioning satellite 41 is not employed.

(3') In case that the positioning satellite 41, the received power from which is equal to a predetermined threshold or more, is recognized as NLOS, the search point $P^{(i)}$ is not employed. The predetermined threshold is determined based on the average of the past received power.

(4') In case that the positioning satellite 41, the received power from which is equal to the predetermined threshold or less, is recognized as LOS, the search point $P^{(i)}$ is not calculated.

The position calculation part 22 solves Equation (1) using a weighted least squares method with the pseudo range row $\hat{R}^{(i)}$ and the satellite position $x_i^{sv}$, thereby calculates a position $\hat{x}^{(i)}$ and sets up it as the reference position. Then, the output deciding part 26 decides an output position $x^r$ and sets up it as the current position of the position detection device 11.

The output deciding part 26 applies the particle filter to the decided output position $x^r$. The particle filter in this embodiment performs, in its each process, all of setup of the search points $P^{(i)}$, estimation, and presumption of the current position. Specifically, the particle filter performs filtering with assuming that the search points $P^{(i)}$ randomly set every second around the initial position $x_0$ are particles. That is, each of the particles scattered every second around the initial position $x_0$ is supposed to be a search point $P^{(i)}$, and, regarding each of the particles, evaluation is performed to set the likelihood using such two indicators as a distance, as one indicator, between the coordinates calculated from the pseudo range row $\hat{R}^{(i)}$ and the initial position $x_0$, and a travel distance, as another indicator, from the preceding position. In this embodiment, the current position is estimated by calculating a weighted average based on the likelihood. The particle filter is designed as follows.

Observation vector: $x(t) = [\varphi^{ref}(t), \lambda^{ref}(t), v_\varphi^r(t), v_\lambda^r(t)]^T$     Equation (9)

State vector: $y_t = [\varphi(t), \lambda(t), v_\varphi(t), v_\lambda(t)]^T$     Equation (10)

State transition model: $y(t) = F_y(t - \Delta t) + N_v(t)$     Equation (11)

State transition matrix:

$$F = \begin{bmatrix} 1 & 0 & \Delta t & 0 \\ 0 & 1 & 0 & \Delta t \\ 0 & 0 & 1 & 0 \\ 0 & 0 & 0 & 1 \end{bmatrix} \quad \text{Equation (12)}$$

In Equations, $\varphi$ and $\lambda$ respectively denotes latitude and longitude, and $v_\varphi$ and $v_\lambda$ respectively denotes the velocity in each direction. The observation vector x(t) has the position $x_0(t) = [\varphi^{ref}(t), \lambda^{ref}(t)]^T$ calculated from the received pseudo range, and the velocity $[v_\varphi^r(t), v_\lambda^r(t)]^T$ measured by the GPS receiver. $N_v(t) \sim N(0, \Sigma_N)$ denotes a normal distribution showing a state noise, and its components are decided experientially.

Each particle in a particle filter has a state $p^{(i)}(t) = y^{(i)}(t)$. Search is performed assuming that each particle in coordinate system is a search point $P^{(i)}$. While the genuine current position is supposed to exist near around $x_0(t)$, it is also supposed to exist quite close to $y(t - \Delta t)$ from continuity of movement. In order to fulfill this, as shown in FIG. 10, in a re-sampling process, a half of particles are distributed according to the normal distribution $N(x_0(t), \Sigma_0)$, and another half of them are distributed according to $N(y(t - \Delta t), \Sigma_{\Delta t})$. In the experiment of this embodiment, since its object was pedestrian, particles were distributed so that they were spread in about 2 [m] radius of the preceding estimated position $y(t - \Delta t)$ and they were spread in about 50 [m] radius of the initial position $x_0(t)$. Likelihood $\pi^{(i)}(t)$ ($i = 1, \ldots, N_p$) of each particle is calculated with the following likelihood function $L(x_t | y_t = p_{t|t-1}^{(i)})$ after re-sampling.

$$\pi^{(i)}(t) = L(x_t | y_t = p_{t|t-1}^{(i)}) \quad \text{Equation (13)}$$
$$= L_{multipath} L_{transition}$$

$$L_{multipath} = \exp\left[-\frac{\|\hat{x}^{(i)}(t) - x_0(t)\|^2}{\sigma_0^2}\right] \quad \text{Equation (14)}$$

$$L_{transition} = \exp\left[-\frac{\|p^{(i)}(t) - Fx(t - \Delta t)\|^2}{\sigma_{\Delta t}^2}\right] \quad \text{Equation (15)}$$

Considering the both of the continuity of the state transition and the similarity of the pseudo range, and assuming that the both follow a normal distribution, the likelihood function is expressed as multiplication of two Gaussian functions. Finally, the weighted average corresponding to the likelihood of all the particles is calculated to be an estimated position $x^r$ as the current position.

Other points in operations are similar to those explained in the first embodiment, therefore description about them is omitted.

Next will be described a third embodiment of the present invention. Structural features similar to the first and second embodiments are denoted by common reference numerals, and repeated description of operation and effects similar to those of the first and second embodiments is omitted.

FIG. 11 is a set of views illustrating a relation between a NLOS path and a LOS path and edges of a structure in a third embodiment of the present invention. In FIG. 11, (a) shows a case where the path goes outside the structure, and (b) shows a case where the path is interrupted by the structure.

In this embodiment, position presumption is performed in consideration of an error model of structure. Therefore, regarding a structure, in case that a ray or a path goes through a fixed range from edges of the structure illustrated by a digital surface model or something, which is a database of measured shape or something of the structure, both LOS and NLOS are presumed and calculated, then likelier one is distinguished.

Specifically, the NLOS reflected path estimating part 24 performs a judgment whether the positioning satellite 41 within vision from the current position of the position detection device 11 is LOS or NLOS, before estimating the error of the multipath based on the ray-tracing method. The judgment is performed based on whether an obstacle exists on the line segment connecting the current position of the position detection device 11 and each of the positioning satellites 41. In this case, as shown in FIG. 11, a minimum distance $d_{min}$ between the edges of the structure around the position detection device 11 and the ray or the path is calculated, since uncertainty (error of the structure) included in the three-dimensional map data should be considered.

Then, in case that the absolute value $|d_{min}|$ of the minimum distance $d_{min}$ is equal to the threshold $d_{threshold}$ or more, it is judged as NLOS if an obstacle exists, and it is judged as LOS if not so. In case that the absolute value $|d_{min}|$ is less than the threshold $d_{threshold}$, both LOS and NLOS are presumed and calculated, then likelier one is selected. The value of the threshold $d_{threshold}$ may be decided according to the accuracy of three-dimensional map data, and, for example, may be 1 [m].

Distinction of likelihood is performed by one or more methods selected from the following (7)-(9).

(7) Residual of least-squares method: The current position of the position detection device 11 is detected by solving an equation of the pseudo range row, such as Equation (1), using a method of weighted least squares, and the residual of this method is adopted as an indicator of likelihood. Specifically, one residual in such a case that NLOS is presumed and that its multipath delay distance is included in the pseudo range is compared with another residual in such a case that LOS is presumed, then the case with the lesser residual is selected.

(8) Received signal strength: LOS is presumed in case that the received signal strength or the received power of the signal from the positioning satellite 41 at a certain time is much stronger than the hitherto average of the received power, and NLOS is presumed in case that the received power is very weak.

(9) Difference between an initial solution and one sought after amending pseudo range by reflection: A distance to an initial position $x_0$ calculated based on pseudo range received by the receiving unit 12 from a calculated position $x_{NLOS}$ of the receiving unit 12, in such a case that NLOS is presumed and that its multipath delay distance is included in the pseudo range, is compared with another distance to the initial position $x_0$ from a calculated position $x_{LOS}$ of the receiving unit 12, in such a case that LOS is presumed, then the case with the shorter distance is selected.

The structures of the position detection device 11 and other points in operations are similar to those explained in the first and second embodiments, therefore description about them is omitted.

Next will be described a fourth embodiment of the present invention. Structural features similar to the first through third embodiments are denoted by common reference numerals, and repeated description of operation and effects similar to those of the first through third embodiments is omitted.

FIG. 12 is a view showing an example of probability of NLOS in a fourth embodiment of the present invention.

In this embodiment, similarly to the third embodiment, position presumption is performed in consideration of an error model of structure. Though, according to this embodiment, the error model is posited on positions of edges of the structure, and, in a case that the ray goes near the edges of the structure, the probability of NLOS and LOS is defined by the error model, instead of setting the threshold $d_{threshold}$ about the minimum distance $d_{min}$ between the edges of the structure and the ray as in the third embodiment. That is, the probability of NLOS and LOS corresponding to the minimum distance $d_{min}$ is defined. Then, the probability is inserted in a position presumption model like the particle filter explained in the second embodiment.

Specifically, assuming that the direction from the edge of the structure to outside denotes positive and that the minimum distance between the edges of the structure and the ray denotes $d_{min}$ as shown in FIG. 11, the probability of NLOS is supposed to follow the integral of a complementary error function as shown in FIG. 12. The probability of NLOS is defined by the following Equation (16).

$$P(\text{NLOS}|d_{min}) = \int_{d_{min}}^{\infty} N(x, 0, \sigma_{map}) dx \quad \text{Equation (16)}$$

In this Equation, N (x, O, $\sigma_{map}$) denotes a normal distribution according to a random variable x, an expected value O, and a variance $\sigma_{map}$. $\sigma_{map}$ is decided according to the accuracy of the three-dimensional map. FIG. 12 shows an example with a vertical axis indicating the probability $P(\text{NLOS}|d_{min})$ of NLOS, and a horizontal axis indicating the minimum distance $d_{min}$, assuming $\sigma_{map} = 0.25$.

In this embodiment, the judgment whether the positioning satellite 41 is NLOS or LOS is performed with this probability, the pseudo range is calculated, and the candidate position is evaluated. In this case, the indicator of likelihood is multiplied by this probability as a likelihood of judged NLOS or LOS. That is, the likelihood of candidate position is multiplied by the probability of LOS when the positioning satellite 41 within vision is judged as LOS, and is multiplied by the probability of NLOS when it is judged as NLOS.

For example, assuming that the likelihood function in the particle filter explained in the second embodiment is $\alpha^{(i)}(t) = L_{multipath} L_{transition}$, this likelihood function is multiplied by $P(\text{LOS}|d_{min})$ or $P(\text{NLOS}|d_{min})$ in the number of the positioning satellites 41. As a result, the likelihood function will be the following Equation (17).

$$\alpha^{(i)}(t) = L_{multipath} L_{transition} \prod_{n=1}^{N} P(NLOS_n \mid d_{min,n}) \qquad \text{Equation (17)}$$

The structures of the position detection device 11 and other points in operations are similar to those explained in the first and second embodiments, therefore description about them is omitted.

Next will be described a fifth embodiment of the present invention. Structural features similar to the first through fourth embodiments are denoted by common reference numerals, and repeated description of operation and effects similar to those of the first through fourth embodiments is omitted.

Figure 13:
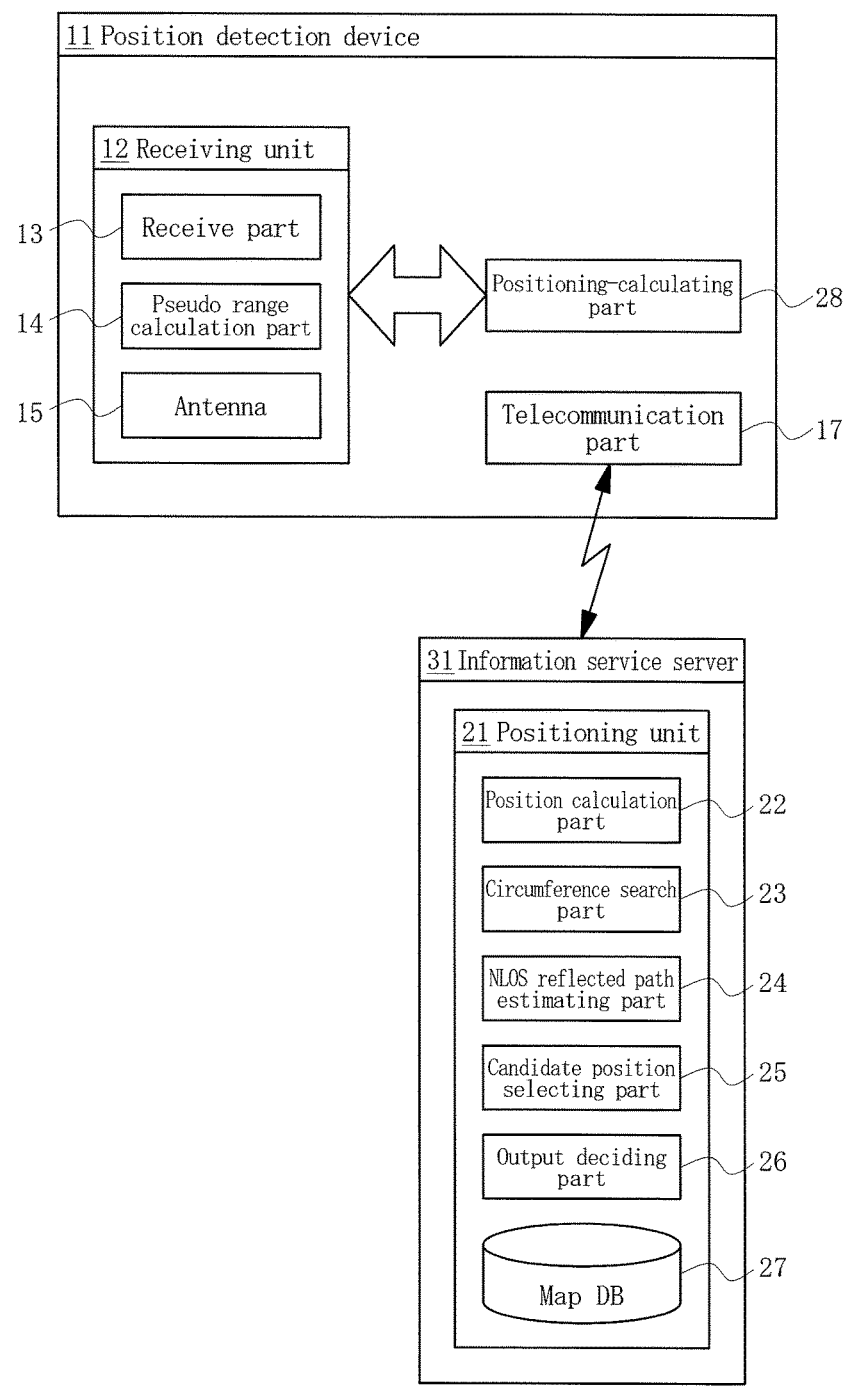
FIG. 13 is a view showing constitution of a position detection system in a fifth embodiment of the present invention.

FIG. 13 is a view showing constitution of a position detection system in a fifth embodiment of the present invention.

In the position detection system of this embodiment, the position detection device 11 is not equipped with the positioning unit 21 as a functional part, as shown in FIG. 13, but is equipped, instead of the positioning unit 21, with a positioning-calculating part 28 for calculating the initial position based on the pseudo range calculated by the pseudo range calculation part 14 of the receiving unit 12. On the other hand, the information service server 31 is equipped with the positioning unit 21 including the position calculation part 22 for calculating the position of the position detection device 11, the circumference search part 23 for searching a plurality of positions existing around the position calculated by the position calculation part 22, the NLOS reflected path estimating part 24, for estimating the delay distance of the NLOS reflected path included in the multipath, which may occur in signal propagation between the position detection device 11 and the positioning satellites 41, the candidate position selecting part 25 for selecting candidate positions based on the positions searched by the circumference search part 23, the output deciding part 26, served as a current position deciding part, for deciding and outputting current positions of the position detection device 11 based on the candidate positions selected by the candidate position selecting part 25, and the map data-base 27 for memorizing and storing map data including three-dimensional map data.

The position detection device 11 transmits data such as the position of the positioning satellite 41 outputted by the receiving unit 12, the pseudo range, and the received signal strength, and a data including the initial position calculated by the positioning-calculating part 28, to the information service server 31 via the telecommunication part 17. Then, the information service server 31, based on the data received from the position detection device 11, selects plural candidate positions around the initial position using the three-dimensional map data and the ray-tracing method, decides and outputs the current position based on the selected candidate position, and sends back the outputted current position to the position detection device 11.

As described above, according to the position detection system of this embodiment, the position detection device 11 is not equipped with the positioning unit 21 as a functional part but the information service server 31 is equipped with it, thereby operation load and memory load of the position detection device 11 may be reduced. Therefore, the position detection device 11 is able to continue to output an accurate current position for a long time, even if it is a device, such as a cellular phone or a smart phone, with relatively poor operational and memorial ability and with a battery or other power sources of small capacity.

By connecting many position detection devices 11 communicably to the information service server 31, it will be possible to accumulate the data received from every position detection devices 11 in the information service server 31 and to use it as the so-called probe data.

In this embodiment, although an example of transferring all the functions of the positioning unit 21 from the position detection device 11 to the information service server 31 is explained, it is possible to transfer a part of the functions of the positioning unit 21, such as the map data-base 27, to the information service server 31 and to leave the remaining functions in the position detection device 11. Further, both of the information service server 31 and the position detection device 11 are able to have all the functions of the positioning unit 21.

It is properly selectable on a case-by-case basis whether the data, such as the current position, calculated by the information service server 31 should be sent to the position detection device 11 or not. For example, in case that the purpose is accumulation of the probe data, it is not necessary to send back the calculated data to the position detection device 11.

Other points in structures and operations of the position detection device 11 and the information service server 31 are similar to those explained in the first through fourth embodiments, therefore description about them is omitted.

Next will be described a sixth embodiment of the present invention. Structural features similar to the first through fifth embodiments are denoted by common reference numerals, and repeated description of operation and effects similar to those of the first through fifth embodiments is omitted.

The structural change of a structure by rebuilding etc. is taken into consideration in this embodiment. Specifically, in case that a path goes near edges of a structure, as shown in FIG. 11, this structure will be not judged to exist if the signal propagation from the positioning satellite 41 is distinguished to be presumed as LOS path (direct path) more likely than as NLOS path (reflected path) according to the methods of (7)-(9) explained in the third embodiment. That is, if a portion of ray reaching the structure is within the error range of the structure presumed based on the aforementioned error model of structure, it will be judged that an error in measurement the structure is its cause, and if the portion of ray is outside the error range of the structure, it will be judged that the structure does not exist.

In this embodiment as well as in the third embodiment, in case that the absolute value $|d_{min}|$ of the minimum distance $d_{min}$ is equal to the threshold $d_{threshold}$ or more, it is judged with referring to three-dimensional map data whether any obstacle exists on the line segment connecting the current position of the position detection device 11 and each positioning satellite 41 or not, then the positioning satellite 41 is judged as LOS or NLOS. When the three-dimensional map data is much different from the reality due to rebuilding of the structure or others, the structure is not judged to exist. This judgement is performed by one or more methods selected from the following (10)-(14).

(10) In case that the residual of least-squares method is less when LOS is presumed than when NLOS is presumed, the structure is not judged to exist.

(11) In case that any reflected path is not found although a ray(s) from one or more positioning satellites 41 in a certain direction is distinguished as NLOS path, the structure is not judged to exist.

(12) In case that, although a ray(s) from one or more positioning satellites 41 in a certain direction is distinguished as NLOS path, the received signal strength of the ray(s) is much stronger than the average strength of received signals from the positioning satellites 41, the structure is not judged to exist.

(13) In case that one or more cases explained in (10)-(12) are continually observed for a certain time period, the structure is not judged to exist.

(14) In case that cases explained in (10)-(13) are observed by a plurality of position detection device 11, the structure is not judged to exist.

A final judgment that the structure does not exist is preferably made based on judgments of a plurality of position detection devices 11. Especially, in cases that the rays cross different parts of the structure, there is a high probability that the structure does not exist. So each position detection device 11 preferably communicates with the information service server 31 and, when judging that the structure does not exist, sends to the information service server 31 its judgment with data including the current position of the position detection device 11 and such data outputted by the receiving unit 12 as the position of the positioning satellite 41, the pseudo range, or the received signal strength.

Thereby, the information service server 31 is able to make a final judgment that the structure does not exist, based on judgments of a plurality of position detection devices 11, and is able to correct the three-dimensional map data by, for example, putting up a flag indicating nonexistence at the place of the structure in the three-dimensional map data. The flag may be put up, for example, at each cell of a 1 [m] cube mesh or over the whole structure. Such a correction may be reflected on the three-dimensional map data included in the map data-base 27 of the position detection device 11 if the position detection device 11 receives it from the information service server 31.

The existence of structure not included in the three-dimensional map data may be estimated by collecting data from many position detection devices 11.

For example, in case that a structure is not deemed to exist in the three-dimensional map data but exists in realty, such that a tall building is newly constructed in an open space, a positioning satellite(s) 41 being in the shade of the structure is out of consideration and is not used for positioning since inconsistency is caused in multipath presumption, etc. Therefore, the positioning itself can be performed as usual and it is possible to collect data about the positioning satellite(s) 41, which is inconsistently judged as LOS or NLOS from the coordinates. The information service server 31 is able to estimate the shape of the structure not included in three-dimensional map data by collecting such data from many position detection devices 11.

For example, even if the possibility of LOS is high based on the ray-tracing method and the three-dimensional map data, there may be a case that the positioning satellite 41 is suspected of being NLOS according to the methods of (7)-(9) explained in the third embodiment. To be suspected being NLOS suggests a possibility that a structure (not included in three-dimensional map data) which interrupts the path may exist on the path. In such a case, probability distribution of structure is decided by a vote on each cubic mesh of the three-dimensional map data. When performing a structure probability vote on the cubic mesh, a robust design is achieved by providing adjacent cubic meshes with vote distribution probability distribution. In this case, a hole structure is not able to be created since the shape of the structure is unknown.

In this embodiment, although an example of an information service server 31, which collects a lot of data from many position detection devices 11 by communicating with them and corrects the three-dimensional map data about existence or nonexistence of the structure, is explained, it is possible that many position detection devices 11 themselves collect data by communicating each other and correct the three-dimensional map data about existence or nonexistence of the structure.

Other points in structures and operations of the position detection device 11 and the information service server 31 are similar to those explained in the first through fifth embodiments, therefore description about them is omitted.

Next will be described a seventh embodiment of the present invention. Structural features similar to the first through sixth embodiments are denoted by common reference numerals, and repeated description of operation and effects similar to those of the first through sixth embodiments is omitted.

Figure 14:
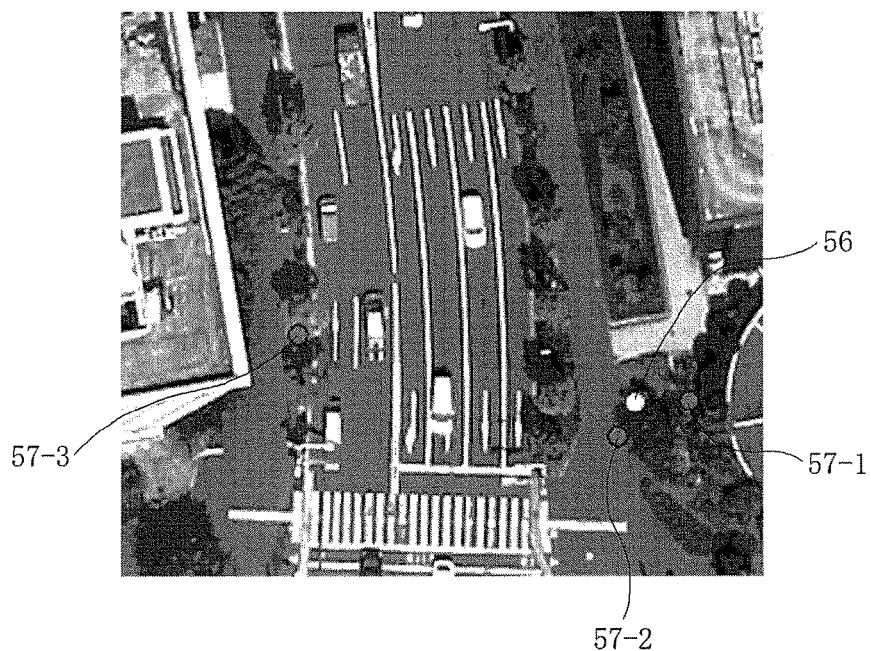
FIG. 14 is a view showing the search points by the second method in a seventh embodiment of the present invention.

FIG. 14 is a view showing the search points by the second method in a seventh embodiment of the present invention.

In this embodiment, the second method of detecting current position in consideration of the multipath effect is the same as that of the first and second embodiments with regard to the following point: they are the method comprising making a position detected by solving Equation (1) as the initial position, calculating the pseudo ranges at plural search points set around the initial position, selecting the candidate positions based on the pseudo ranges, and detecting the current position based on the candidate positions of the lesser than predetermined distance from the initial position. Though, this embodiment is different with regard to the following point: when selecting the candidate positions, it verifies similarity between the pseudo range row R, which is a set of the pseudo ranges to the positioning satellites 41 measured by the receiving unit 12, and the pseudo range row $\hat{R}^{(i)}$, which is a set of the search point pseudo ranges including the multipath delay distances including the NLOS reflected path delay distances estimated by the three-dimensional map data and the ray-tracing method, then selects the search points of high similarity as the candidate positions.

The structure of the position detection device 11 and the first method of detecting current positions in consideration of the multipath effect are similar to those of the first embodiment, therefore repeated description about them is omitted.

From the view of the genuine position of the position detection device 11, the distance to the positioning satellite 41 estimated by the three-dimensional map data and the ray-tracing method should be equal to that measured by the receiving unit 12. So, in this embodiment, an observed value or the distance to the positioning satellite 41 measured by the receiving unit 12 is compared with an estimated value or the distance to the positioning satellite 41 estimated by the three-dimensional map data and the ray-tracing method.

When the signal propagation from the positioning satellite 41 is a LOS path, the estimate value consists with distance in a straight line and, when it is a reflected path, the estimate value consists with the length of the reflected path calculated by the ray-tracing method. Since the pseudo range to the positioning satellite 41 measured by the receiving unit 12 includes errors such as a time delay of clock of the receiving unit 12 from GPS time scale or a delay distance due to ionosphere, the overserved value consists with a value excluding such errors. The overserved value corresponds to the length of the reflected path, since an effect of reflected path is notable to judge just by an overserved signal.

In this embodiment as well as in the first and second embodiments, the position calculation part 22 uses the pseudo range row R outputted at a predetermined time interval by the receiving unit 12 and, by solving Equation (1) using the method of weighted least squares at each time when coordinates of the positioning satellite 41 or the satellite position $x_i^{sv}$ is received, calculates the position $x^r$ of antenna 15 or the receiving unit 12 to set up it as an initial position $x_0$.

Then, the circumference search part 23, as well as in the first and second embodiments, sets up search points $P^{(i)}$ at a plurality of positions around the initial position $x_0$ set by the position calculation part 22. In an example shown in FIG. 14, a round mark 56 shows the initial position $x_0$, and round marks 57-1 to 57-3 show the search points $P^{(1)}$ to $P^{(3)}$. Any real current position or any genuine current position of the position detection device 11 is not depicted but is on the right side of the road and near the round mark 56.

As described above, in this embodiment, when selecting the candidate positions from the search points, the position detection device 11 verifies similarity between the pseudo range row R, which is a set of the pseudo ranges to the positioning satellites 41 measured by the receiving unit 12, and the pseudo range row $\hat{R}^{(i)}$, which is a set of the search point pseudo ranges including the multipath delay distances including the NLOS reflected path delay distances estimated by the three-dimensional map data and the ray-tracing method, then evaluates the search points $P^{(i)}$. That is, the search points $P^{(i)}$ with high similarity are selected as the candidate positions. The following methods (15)-(17) are available with regard to this.

(15) The similarity is verified by comparing a result of subtracting a distance corresponding to time delay $\delta t^r$ of clock of the receiving unit 12 from GPS time scale or, a receiving unit clock delay distance, from the pseudo range row R measured by the receiving unit 12 with a distance between the search point $P^{(i)}$ and the positioning satellite 41.

(16) The similarity is verified by comparing the pseudo range row R measured by the receiving unit 12 with the pseudo range row $\hat{R}^{(i)}$ as the search point pseudo range calculated including the receiving unit clock delay distance.

(17) The similarity is verified by comparing the difference between pseudo ranges each other in the pseudo range row R measured by the receiving unit 12 with the difference between pseudo ranges each other in the pseudo range row $\hat{R}^{(i)}$ as the search point pseudo range.

Since the methods (15)-(17) are logically equivalent, for the convenience of description, just a case where the method (16) is employed will be described.

According to the Equation (3), the candidate position selecting part 25 calculates the pseudo range row $\hat{R}^{(i)}$, as a search point pseudo range, on all the search points $P^{(i)}$. The NLOS reflected path estimating part 24, as well as in the first embodiment, estimates multipath delay distance $\varepsilon^{multipath}$ including the delay distance of NLOS reflected path by the ray-tracing method and the three-dimensional map data.

The candidate position selecting part 25 verifies the similarity by comparing the pseudo range row R measured by the receiving unit 12 with the pseudo range row $\hat{R}^{(i)}$ as the search point pseudo range. For example, by the following Equation (18), the average of the difference of the pseudo range regarding every positioning satellite 41 is calculated, and the average is used as index showing the similarity.

$$\frac{\sum_{n=1}^{N} R_n - \hat{R}_n^{(i)}}{N} \qquad \text{Equation (18)}$$

In this Equation, $R_n$ denotes the pseudo range calculated regarding $n^{th}$ positioning satellite 41, and N denotes the number of the positioning satellites 41 observed.

The average according to the equation (18) means that, the less the average becomes, the more the similarity becomes and that, the more the average becomes, the less similarity becomes.

Regarding search points $P^{(1)}$ to $P^{(3)}$ shown as round marks 57-1 to 57-3 in FIG. 14, averages were calculated according to the Equation (18). The calculated averages were 6.70 regarding the search point $P^{(1)}$, 6.21 regarding the search point $P^{(2)}$, and 16.02 regarding the search point $P^{(3)}$.

Therefore, it is possible to exclude the search point $P^{(3)}$, which is on the left side of the road and far away from the initial position $x_0$, from the candidate positions for the genuine current position, by setting a threshold appropriate to exclude any search point with low similarity and high average of difference of the pseudo ranges.

Other points in operations are similar to those explained in the first and second embodiments, therefore description about them is omitted.

As described above, according to the present embodiment, the similarity between the pseudo range row R, which is a set of the pseudo ranges to the positioning satellites 41 measured by the receiving unit 12, and the pseudo range row $\hat{R}^{(i)}$, which is a set of the search point pseudo ranges including the NLOS reflected path delay distances estimated by the three-dimensional map data and the ray-tracing method, is made as an evaluation indicator to narrow down the candidate positions. That is, the similarity is made a criterion to select the candidate positions. The similarity may be used as a lone evaluation indicator or criterion to narrow down the candidate positions, and it also may be joined to the evaluation indicators or criteria to select the candidate positions explained in the first and second embodiments.

Next will be described an eighth embodiment of the present invention. Structural features similar to the first through seventh embodiments are denoted by common reference numerals, and repeated description of operation and effects similar to those of the first through seventh embodiments is omitted.

Figure 15:
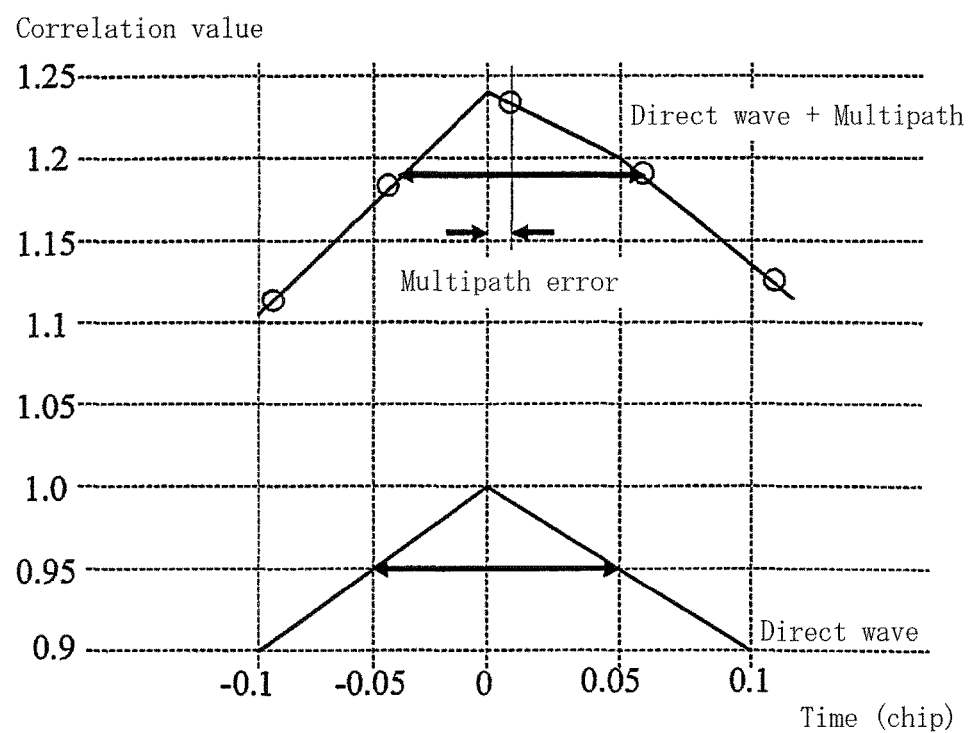
FIG. 15 is a view showing an example of correlation wave outputted by a correlator in an eighth embodiment of the present invention.

FIG. 15 is a view showing an example of correlation wave outputted by a correlator in an eighth embodiment of the present invention. FIG. 16 is a set of views showing a locus of current positions detected by considering a possibility of antiphase multipath in the eighth embodiment of the present invention. In FIG. 16, (a) shows a result of a case not calculating any pseudo range when the positioning satellite is LOS and a received power is equal to a threshold or less and, and (b) shows a result of a case considering the possibility of antiphase multipath when the positioning satellite is LOS and a received power is equal to the threshold or less.

In the first and second embodiments, based on consideration of compatibility with the visibility of the positioning satellite 41 estimated from the intensity of received power, and based on presumption that the positioning satellite 41 cannot be LOS when the intensity of received power is weak, any pseudo range from a search point to a positioning satellite 41 is not calculated if the positioning satellite 41, the received power from which is equal to a predetermined threshold or less, is recognized as LOS at the search point.

However, in case that the intensity of received power is weak, there is a possibility of so-called antiphase multipath besides the positioning satellite 41 being NLOS. Then, in this embodiment, the three-dimensional map data and the ray-tracing method are used, and a possibility of antiphase multipath is considered in case that a positioning satellite 41 in sight from a search point is LOS and that a pseudo range observed at the search point is close to a pseudo range estimated based on the three-dimensional map data and the ray-tracing method. That is, a positioning satellite 41 may be judged as LOS even if the intensity of received power from it is weak. The possibility becomes higher in case that the observed pseudo range is shorter than the estimated one.

Even in case that the positioning satellite 41 is LOS, the receiving unit 12 is subject to the multipath effect and may receive a signal propagated through a reflected path other than one through a direct path. The antiphase multipath means a multipath in which a phase of signal, propagated through a direct path from the positioning satellite 41 and received by the receiving unit 12, and a phase of signal, propagated through a reflected path from the positioning satellite 41 and received by the receiving unit 12, are different about 180 degrees or are in almost antiphase each other. A usual GPS receiver, such as the receiving unit 12, is equipped with a correlator (correlation-type receiver), and detects real peaks from shapes of correlation waves of a very weak signal. Therefore, when a phase of received signal propagated through a direct path and a phase of received signal propagated through a reflected path are in almost antiphase each other, they cancel each other, so that the peaks become low and the intensity of received power becomes weak.

Therefore, in case that the intensity of received power is weak, it can be identified whether the positioning satellite 41 is NLOS or the antiphase multipath, by evaluating symmetric property of the shape of correlation wave outputted by correlator (not shown) of the receiving unit 12. It is thought to be NLOS when the symmetric property is low, and it is thought to be the antiphase multipath when the symmetric property is high.

As shown in FIG. 15, it has already been verified that the peak of correlation waves outputted by a correlator of a GPS receiver may deviate to the right or to the left due to the influence of multipath (For example, refer to Non-Patent Document 2). In FIG. 15, the vertical axis denotes a correlation value (dimensionless), and the horizontal axis denotes time (chip). 1 [chip] is equivalent to a delay distance of about 300 [m].

Non-Patent Document 2: Nobuaki Kubo, Akio Yasuda, Takashi Suzuki, "The Possibility of the Precise Positioning and Multipath Error Mitigation", the Institute of Electronics, Information and Communication Engineers, ITS study group research paper, "Technical Report of IEICE" July 2004, pp. 1-6.

In case that it is more naturally considered as the antiphase multipath than as NLOS by the judgment combining a locus (i.e., tracking) of the moving search point and a time series data of the intensity of received power, for example, in case that it ought not to be considered suddenly changed into NLOS by presuming from thitherto positions of the search point, it is judged as the antiphase multipath.

In this embodiment, when the intensity of received power from the positioning satellite 41 is weak, the positioning unit 21 judges whether the signal propagation from the positioning satellite 41 is LOS or NLOS, based on the shape of correlation wave outputted by correlator of the receiving unit 12. Then, when the symmetric property of the shape of correlation wave is high, the positioning unit 21 judges that the signal propagation from the positioning satellite 41 is LOS and the antiphase multipath.

FIG. 16 shows the output positions outputted by the output deciding part 26 or the current positions of the position detection device 11 plotted on a map. FIG. 16 (*a*) shows a result of a case that, as well as in the first and second embodiments, the search point, from which the positioning satellite 41 of received power of intensity less than a predetermined threshold is recognized as LOS, is disposed or is not selected as the candidate position, and the output position is calculated. FIG. 16 (*b*) shows a result of a case that even the search point, from which the positioning satellite 41 of received power of intensity less than a predetermined threshold is recognized as LOS, is not disposed and is selected as the candidate position in consideration of probability of the antiphase multipath, and the output position is calculated. The map in FIG. 16 is a three-dimensional map showing a vicinity of a crossing at the near-center of FIG. 5.

In FIG. 16, a plurality of square marks 58 shows an actual locus which the inventors moved on the street with the position detection device 11 (GPS receiver). A plurality of round marks 59 shows a locus of the current positions of the position detection device 11 outputted by the output deciding part 26.

It is apparent that some points, which are unable to be calculated as the output positions in FIG. 16 (*a*), are calculated in FIG. 16 (*b*). In figures, while the success rate of search is about 70 [%] as the result shown in FIG. 16(*a*), it is up to 90 [%] or more as the result shown in FIG. 16(*b*).

The structures of the position detection device 11 and other points in operations are similar to those explained in the first and second embodiments, therefore description about them is omitted.

Next will be described a ninth embodiment of the present invention. Structural features similar to the first through eighth embodiments are denoted by common reference numerals, and repeated description of operation and effects similar to those of the first through eighth embodiments is omitted.

Figures 1, 17:
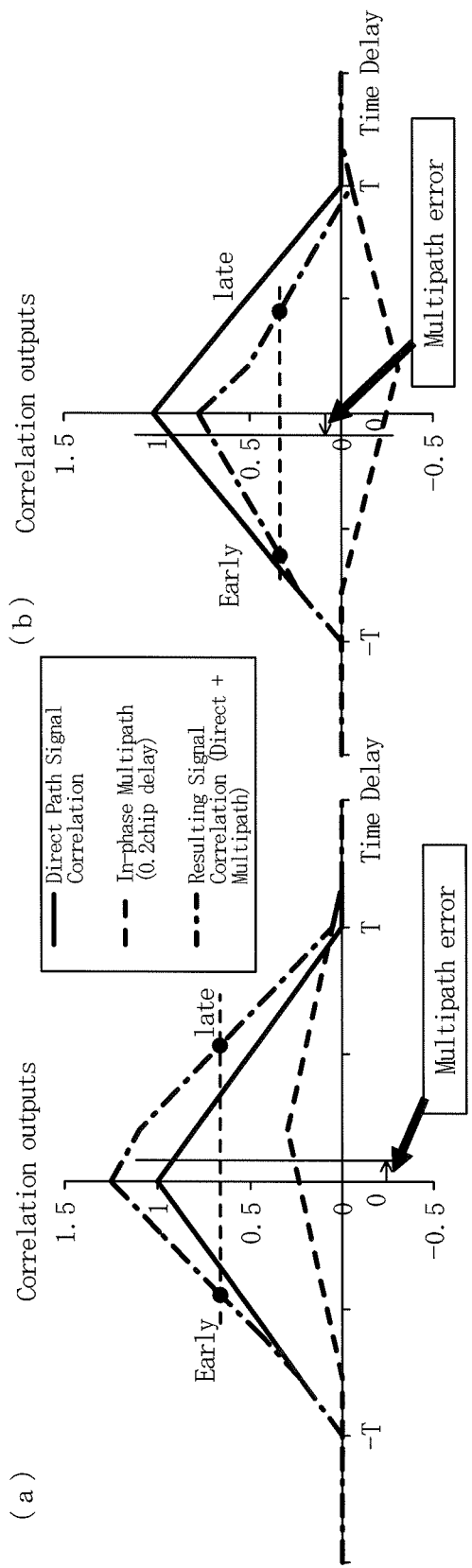
Figure 18:
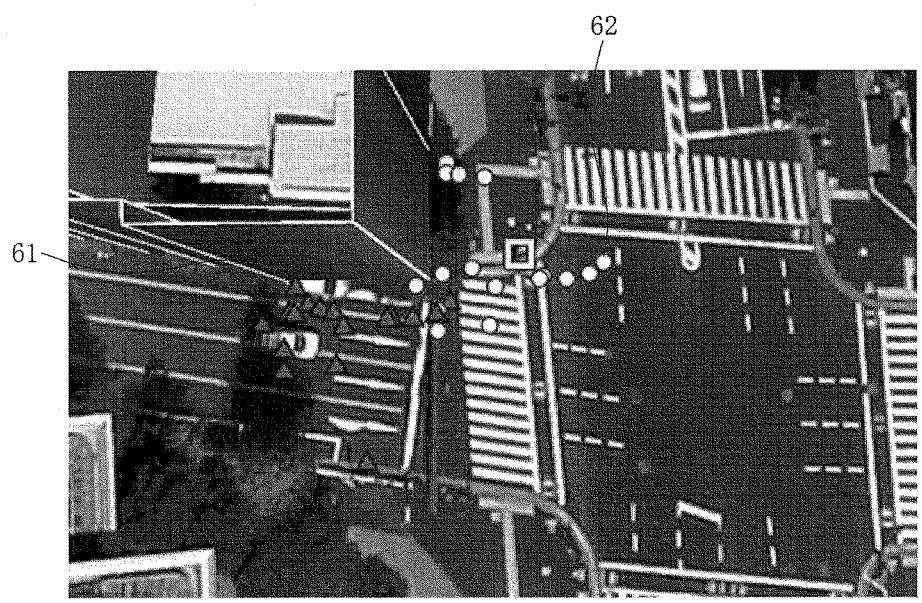
FIG. 18 is a view showing a current position detected with compensating the multipath error in the ninth embodiment of the present invention.

FIG. 17-1 is a set of views showing relations between reflected waves and correlation waves outputted by a correlator in a ninth embodiment of the present invention. FIG. 17-2 is a set of views showing relations between delay distances and multipath errors in the ninth embodiment of the present invention. FIG. 18 is a view showing a current position detected with compensating the multipath error in the ninth embodiment of the present invention. In FIG. 17-1, (a) shows a case that a reflected wave is in phase, and (b) shows a case that a reflected wave is in antiphase. In FIG. 17-2, (a) shows a case of a usual correlator and (b) shows a case of comparing plural types of correlators.

In the first and second embodiments, based on consideration of compatibility with the visibility of the positioning satellite 41 estimated from the intensity of received power, and based on presumption that the positioning satellite 41 cannot be NLOS but should be LOS when the intensity of received power is strong, the pseudo range from the search point to the positioning satellite 41 is calculated without considering the reflected path.

However, even in case that the positioning satellite 41 is LOS, the receiving unit 12 is subject to the multipath effect and may receive a signal propagated through a reflected path other than one through a direct path. Then, in this embodiment, the three-dimensional map data and the ray-tracing method are used, whether the signal propagation from the positioning satellite 41 is LOS or NLOS is judged, then, in case of LOS, whether it is a multipath including both a direct path and a reflected one or not is judged, further, in case of the multipath, the pseudo range calculated by the receiving unit 12 is compensated by considering the delay of reflected path, and the current position is decided based on the compensated pseudo range. That is, in case that the intensity of the received power from the positioning satellite 41 is strong, the positioning unit 21 judges whether the positioning satellite 41 is LOS or NLOS using three-dimensional map data and the ray-tracing method, and, in cases of LOS and of the multipath, compensates the pseudo range in consideration of delay, and decides the current position based on the compensated pseudo range.

In case that the positioning satellite 41 is NLOS, the signal from the positioning satellite 41 is not employed for positioning calculation, as well as in the cases of the first and second embodiments.

In case that the positioning satellite 41 is LOS, it is judged whether only the direct wave (the signal propagated through the direct path) from the positioning satellite 41 is received or not only the direct wave but also the reflected wave (the signal propagated through the reflective path) reflected on the wall surface of the building or others is received, that is, the multipath is received.

There are two methods for judging whether it is the multipath or not.

The first one is a method of judging the course of signal propagation or the path, by using the three-dimensional map data and the ray-tracing method. In this method, if both the direct path and the reflected path exist from the positioning satellite 41 to the position detection device 11 or the receiving unit 12, it is judged as the multipath, and if only the direct path exists, it is judged as not the multipath.

The second one is a method of judging based on the shape of the correlation wave outputted by the correlator. In an environment where only a direct wave is received, the shapes of the correlation waves are shown as full lines in FIG. 17-1. However, if the reflected waves, shown as dashed lines, are also received simultaneously, the shapes of the correlation wave outputted become distorted, shown as chain lines. Therefore, based on the shape of the correlation wave, it is possible to be judged as the multipath, including both the direct path and the reflected path, or not. The shapes of the correlation waves vary according to the phase difference between the direct wave and the reflected wave. That is, if they are in phase, the right side swells as shown in FIG. 17-1 (*a*), and if they are out of phase, the right side dents as shown in FIG. 17-1 (*b*).

The inventors of the present invention experimented with employing the first method. In the first method, if existence of the reflected path is judged by the three-dimensional map data and the ray-tracing method, the delay distance of the reflected path from the direct path may be calculated. The phase between the direct wave and the reflected wave may be judged by referring to the intensity of received power. That is, if the intensity of received power is strong, they are judged in phase, and if it is weak, they are judged in antiphase. In case that the receiving unit 12 is possible to output the correlation wave, the phase between the direct wave and the reflected wave may be judged based on the shape of the correlation wave.

There are following two methods, (18) and (19), as methods for considering the delay.

(18) With assuming an equalized model (based on an experience value), an error of detection (distance measurement) is estimated.

(19) With piling up a reflected wave calculated considering the surface material (reflection factor) of structures, such as buildings, over the wave, an error of detection (distance measurement) is estimated.

The magnitude of multipath error included in the pseudo range corresponding to the delay distance of the reflected path from the direct path is decided in accordance with the type of correlator, the intensity of the reflected wave, the phase, and the delay distance. The theoretical value of the magnitude becomes as shown in FIG. 17-2.

As shown in FIG. 17-2, the relation between the delay distance and the multipath error, theoretically calculated based on the specification of correlator, is verified (For example, refer to Non-Patent Document 3). In FIG. 17-2, (a) shows a case of a usual correlator and (b) shows a case that plural types of correlators are compared. The values shown in FIG. 17-2 are calculated assuming that the amplitude of the multipath reflected wave is a half of that of the direct wave (the signal propagated through the direct path). Actually, the amplitude and delay distance of the multipath reflected wave vary every moment, so the multipath error occurs within the maximum values shown in FIG. 17-2.

Non-Patent Document 3: M. Braasch, "Performance comparison of multipath mitigating receiver architectures," in Aerospace Conference, 2001, IEEE Proceedings, vol. 3, 2001, pp. 3/1309-3/1315 vol. 3.

Based on this, discussed will be a model of multipath error in the position detection device 11 (GPS receiver), which the inventors of the present invention employed for the experiment. Correlators of recent GPS receivers are usually so-called narrow correlators. Therefore, based on FIG. 17-2 (*b*) and assuming that a narrow correlator is employed, the multipath error ε regarding the delay distance d is supposed to be denoted by the following Equation (19) or (20) as a simplified estimation.

$$\varepsilon = (\alpha/30)d (d<30) \quad \text{Equation (19)}$$

$$\varepsilon = \alpha (d \geq 30) \quad \text{Equation (20)}$$

In these Equations, α is supposed to be 6 [m] based on experiment.

The positioning unit 21 calculates the multipath error ε corresponding to the delay distance d, and compensates the pseudo range with the multipath error ε.

FIG. 18 shows a result of positioning by the inventors standing still for 20 seconds with the position detection device 11, that is, a result of the first experiment detecting the current position by the position detection device 11.

Specifically, it is a result of solving Equation (1) using the weighted least squares method (least-squares method with weighting), without using such a method of setting plural positions (search points) around the initial position and calculating the pseudo ranges at the plural positions as explained in the first and second embodiments. The map in FIG. 18 is a three-dimensional map expanding and showing a vicinity of a crossing in FIG. 16.

In FIG. 18, a square mark shows the genuine current position of the position detection device 11 situated at the northwest corner of the crossing. Triangle marks 61 are the results of positioning calculation by using the observed pseudo range or the pseudo range outputted by the receiving unit 12 without any compensation. Round marks 62 are the result of calculating multipath error s from the observed pseudo range based on the above mentioned model of positioning calculation by using the pseudo range compensated by the multipath error ε. Since they are the result of positioning calculation for 20 seconds, there are plural results of positioning calculation with triangle marks 61 and round marks 62. It is apparent that the round marks 62 are closer to the genuine current position than the triangle marks 61.

As described above, the pseudo range outputted by the receiving unit 12 includes the multipath error, and the average error included in the result of positioning for 20 seconds was 13.7 [m]. After compensating the pseudo range by the multipath error, the average error for 20 seconds was able to be reduced to 6.8 [m].

Next will be explained the result of the second experiment in this embodiment. In the second experiment, the following point is the same as the second embodiment: The point is that a position detected through solving Equation (1) is set as the initial position, the pseudo ranges at plural search points randomly set up around the initial position are calculated, the candidate positions are selected based on the pseudo ranges, the likelihoods are calculated through evaluations using such indicators as the distance from the initial position and the travel distance from the preceding position, and the current position is estimated by calculating the weighted average based on the likelihoods. Though, the following point is different from the second embodiment: The point is that the multipath error ε denoted by Equation (19) or (20) is taken into consideration.

Figure 21:
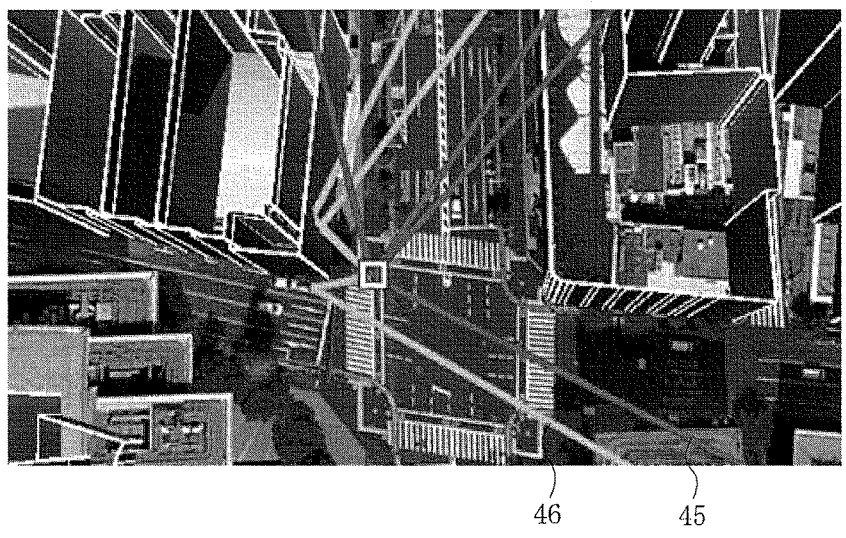
FIG. 21 is a view showing a second example of ray-tracing at a genuine current position in the ninth embodiment of the present invention.

FIG. 19 is a view showing a first example of ray-tracing at a genuine current position in the ninth embodiment of the present invention. FIG. 20 is a set of views showing a first example of candidate positions in the ninth embodiment of the present invention. FIG. 21 is a view showing a second example of ray-tracing at a genuine current position in the ninth embodiment of the present invention. FIG. 22 is a set of views showing a second example of candidate positions in the ninth embodiment of the present invention. In FIGS. 20 and 22, (a) shows a case of not considering multipath error ε, and (b) shows a case of considering multipath error ε.

In FIG. 19, signal propagations from the positioning satellites 41 at the first current position are shown. The map in FIG. 19 is a three-dimensional map showing a vicinity of the same crossing as in FIG. 18, and a square mark shows the genuine current position of the position detection device 11 situated at the northeast corner of the crossing. The line 45 designates a direct path or a signal propagation from a positioning satellite 41 in sight from the current position of the position detection device 11, and the line 46 designates a reflected path or a signal propagation, from a positioning satellite 41, reflected on a structure surface. In FIG. 19, since there are four of the lines 45 designating direct paths, and four of the lines 46 designating reflective paths, it is apparent that signals from all the four positioning satellites 41 are identified as the multipath.

In case of not considering multipath error ε, the average difference between the pseudo range observed at the genuine current position or the correct coordinates and the pseudo range estimated based on the three-dimensional map data and the ray-tracing method was 2.1 [m], and a distribution of the candidate positions was as shown in FIG. 20 (*a*). In FIGS. 20 (*a*) and (*b*), a plurality of small round marks 65 designates the candidate position of low likelihood, a plurality of slightly big round marks 64 designates the candidate position of high likelihood, and a single biggest round mark 63 designates the weighted average of all of the candidate position or a result of estimation. The error of the result of estimation was 3.3 [m].

On the other hand, in case of considering multipath error ε, the average difference between the pseudo range observed at the genuine current position and the pseudo range estimated based on the three-dimensional map data and the ray-tracing method was 0.5 [m], and the distribution of the candidate positions was as shown in FIG. 20 (*b*). And the error of the result of estimation was 0.5 [m]. As compared with the case of not considering multipath error ε, the error of the result of estimation was reduced greatly.

In FIG. 21, signal propagations from the positioning satellites 41 at the second current position are shown. The map in FIG. 21 is a three-dimensional map showing a vicinity of the same crossing as in FIGS. 18 and 19, and a square mark shows the genuine current position of the position detection device 11 situated at the northwest corner of the crossing. As well as in FIG. 19, the line 45 designates a direct path or a signal propagation from a positioning satellite 41 in sight from the current position of the position detection device 11, and the line 46 designates a reflected path or a signal propagation, from a positioning satellite 41, reflected on a structure surface. In FIG. 21, since there are four of the lines 45 designating direct paths, and three of the lines 46 designating reflective paths, it is apparent that signals from three of the four positioning satellites 41 are identified as the multipath.

In case of not considering multipath error ε, the average difference between the pseudo range observed at the genuine current position and the pseudo range estimated based on the three-dimensional map data and the ray-tracing method was 1.9 [m], and a distribution of the candidate positions was as shown in FIG. 22 (*a*). The error of the result of estimation was 12.9 [m].

On the other hand, in case of considering multipath error ε, the average difference between the pseudo range observed at the genuine current position and the pseudo range estimated based on the three-dimensional map data and the ray-tracing method was 1.5 [m], and the distribution of the candidate positions was as shown in FIG. 22 (*b*). And the error of the result of estimation was 2.3 [m]. As compared with the case of not considering multipath error ε, the error of the result of estimation was reduced greatly.

The structures of the position detection device 11 and other points in operations are similar to those explained in the first and second embodiments, therefore description about them is omitted.

Next will be described a tenth embodiment of the present invention. Structural features similar to the first through ninth embodiments are denoted by common reference numeral, and repeated description of operation and effects similar to those of the first through ninth embodiments is omitted.

In this embodiment, calculation for positioning is performed considering the possibility of error in the three-dimensional map data, specifically the possibility of position error in direction perpendicular to wall surfaces of the structure. That is, by moving the coordinates of the outer wall surface of the structure in the perpendicular direction, a position, where the residual of least-squares method or the error becomes small, is searched, and this position is estimated as the actual coordinate of the outer wall surface of the structure. Although the position detection device 11 detects the current position by using the weighted least squares method and by solving an equation of a pseudo range row such as Equation (1), in this embodiment, it searches a position where the error becomes small and estimates the position as the actual position.

The error distribution is gained by voting such an estimated result in an error space. In this case, it is possible to vote results of plural estimations performed by one user using the position detection device 11, and to vote results of estimations performed by each of plural user using the position detection device 11. Also it is possible to compensate the three-dimensional map data about the coordinate of the outer wall surface of the structure based on the error distribution.

The present invention is not limited to the above embodiments, but may be diversely modified and varied. Thus, the modifications and variations are not excluded from the scope of protection of the present invention.

INDUSTRIAL APPLICABILITY

The present invention is applicable to a position detection device, a position detection system, and a position detection method.

DESCRIPTION OF REFERENCE NUMERALS

11: Position detection device
12: Receiving unit
21: Positioning unit
22: Position calculation part
23: Circumference search part
25: Candidate position selecting part
26: Output deciding part
31: Information service server
41: Positioning satellite

The invention claimed is:

1. A position detection device comprising:
a receiving unit receiving signals from a positioning satellite, the receiving unit calculating a pseudo range to the positioning satellite based on the signals, and
a positioning unit, the positioning unit calculating an initial position based on the pseudo range calculated by the receiving unit, the positioning unit setting a mesh around the initial position, the positioning unit setting plural positions which are lattice points of the mesh as search points, the positioning unit calculating the pseudo range from each of the search points to each positioning satellite, as a search point pseudo range including a NLOS reflected path delay distance estimated by a three-dimensional map data and a ray-tracing method, the positioning unit calculating a reference position based on the search point pseudo range, the positioning unit selecting, as candidate positions, the search points of which distance between the reference position and the initial position is equal to a threshold or less, and the positioning unit deciding a current position based on the selected candidate positions.

2. The position detection device according to claim 1, wherein the positioning unit sets the mesh around the selected candidate position, and repeats setting the search points, calculating the search point pseudo range, calculating the reference position, and selecting the candidate positions.

3. The position detection device according to claim 1, wherein, when the number of the candidate position selected is less than a predetermined number, the positioning unit decides the candidate position of the shortest distance from the initial position as the current position, and, when the number of the candidate position selected is equal to the predetermined number or more, the positioning unit selects again the candidate position of the distance from the initial position equal to the threshold or less, and decides the current position by calculating an average weighted with an inverse of the distance from the initial position with regard to the candidate position selected again.

4. A position detection device comprising:
a receiving unit receiving signals from a positioning satellite, the receiving unit calculating a pseudo range to the positioning satellite based on the signals, and
a positioning unit, the positioning unit calculating an initial position based on the pseudo range calculated by the receiving unit, the positioning unit setting plural positions randomly around the initial position, the positioning unit setting the plural positions as search points, the positioning unit calculating the pseudo range from each of the search points to each positioning satellite, as a search point pseudo range including a NLOS reflected path delay distance estimated by a three-dimensional map data and a ray-tracing method, the positioning unit selecting candidate positions based on the search point pseudo range, the positioning unit adopting a value based on the distance between the candidate positions and the initial position as a likelihood, and the positioning unit deciding a weighted average corresponding to the likelihood of the candidate positions as the current position.

5. A position detection device comprising:
a receiving unit receiving signals from a positioning satellite, the receiving unit calculating a pseudo range to the positioning satellite based on the signals, and
a positioning unit, the positioning unit calculating an initial position based on the pseudo range calculated by the receiving unit, the positioning unit setting plural positions around the initial position, the positioning unit setting the plural positions as search points, the positioning unit calculating the pseudo range from each of the search points to each positioning satellite, as a search point pseudo range including a NLOS reflected path delay distance estimated by three-dimensional map data and a ray-tracing method or both a LOS and the NLOS reflected path delay distance, the positioning unit selecting, as candidate positions, the search points of high similarity between a set of the search point pseudo ranges and a set of the pseudo range calculated by the receiving unit, and the positioning unit deciding a current position based on the candidate positions within such a short distance from the initial position that predetermined conditions are satisfied.

6. The position detection device according to claim 1, wherein the positioning unit further adds a similarity between a set of the search point pseudo ranges and a set of the pseudo range calculated by the receiving unit to criteria for selecting the candidate positions.

7. The position detection device according to claim 1, wherein the positioning unit has a position calculation part calculating the initial position, a circumference search part searching the plural positions, a candidate position selecting part selecting the candidate positions, and a current position deciding part deciding the current position.

8. The position detection device according to claim 1, wherein, in case that a signal propagation from the positioning satellite goes through a fixed range from edges of a structure included in the three-dimensional map data, the position detection device presumes a case that the signal propagation is LOS and a case that the signal propagation is NLOS, calculates the pseudo range to the positioning satellite in both cases, and selects a likelier one from LOS and NLOS.

9. The position detection device according to claim 1, wherein, in case that a signal propagation from the positioning satellite goes through a fixed range from edges of a structure included in the three-dimensional map data, the position detection device posits an error model on positions of the edges of the structure, and defines a probability that the signal propagation is LOS and a probability that the signal propagation is NLOS.

10. The position detection device according to claim 1, wherein, in case that a residual of least-squares method for calculating the initial position is smaller when presuming that a signal propagation from the positioning satellite is a direct path rather than a reflected path reflected by a structure included in the three-dimensional map data, the position detection device judges that the structure does not exist.

11. The position detection device according to claim 10, wherein, when plural position detection devices judge that the structure does not exist, the judgment is reflected in the three-dimensional map data.

12. The position detection device according to claim 1, wherein, in case that an intensity of received power from the positioning satellite is weak, the position detection device judges whether the signal propagation from the positioning satellite is LOS or NLOS based on a shape of correlation wave outputted by a correlator of the receiving unit.

13. The position detection device according to claim 12, wherein, when symmetric property of the shape of correlation wave is high, the position detection device judges that the signal propagation from the positioning satellite is LOS and an antiphase multipath.

14. The position detection device according to claim 1, wherein, in case that an intensity of received power from the positioning satellite is high, the position detection device judges whether the signal propagation from the positioning satellite is LOS or NLOS using the three-dimensional map data and the ray-tracing method, and, when it is LOS, compensates the pseudo range in consideration of delay.

15. The position detection device according to claim 14, wherein the position detection device calculates a multipath error according to a delay distance, and compensates the pseudo range with the multipath error.

16. The position detection device according to claim 1, wherein the position detection device moves coordinates of a wall surface of a structure in a direction perpendicular to the wall surface, in consideration of a possibility of a position error in the direction perpendicular to the wall surface of the structure included in the three-dimensional map data, searches a position where a residual of least-squares method is small, and estimates that the position is the position of wall surface.

17. A position detection method comprising:
receiving signals from a positioning satellite,
calculating a pseudo range to the positioning satellite based on the signals,
calculating an initial position based on the pseudo range,
setting a mesh around the initial position,
setting plural positions which are lattice points of the mesh as search points,
calculating the pseudo range from each of the search points to each positioning satellite, as a search point pseudo range including a NLOS reflected path delay distance estimated by three-dimensional map data and a ray-tracing method,
calculating a reference position based on the search point pseudo range,
selecting, as candidate positions, the search points of which distance between the reference position and the initial position is equal to a threshold or less, and
deciding a current position based on the selected candidate positions.

18. A position detection device comprising:
a receiving unit receiving signals from a positioning satellite, the receiving unit calculating a pseudo range to the positioning satellite based on the signals, and
a positioning unit, the positioning unit judging whether a signal propagation from the positioning satellite is LOS or NLOS using a three-dimensional map data and a ray-tracing method, the positioning unit, when it is LOS, judging whether it is a multipath including both a direct path and a reflected path or not, the positioning unit, when it is the multipath, compensating the pseudo range calculated by the receiving unit in consideration of delay of the reflected path, and the positioning unit deciding a current position based on the compensated pseudo range.

19. The position detection device according to claim 18, wherein the positioning unit calculates a multipath error according to a delay distance of the reflected path, and compensates the pseudo range with the multipath error.

20. The position detection device according to claim 19, wherein the multipath error is calculated based on a model configured corresponding to characteristics of a correlator of the receiving unit.

21. The position detection device according to claim 20, wherein the positioning unit, when the signal propagation from the positioning satellite is LOS, judges whether it is the multipath or not based on a shape of correlation wave outputted by a correlator of the receiving unit.

22. The position detection device according to claim 18, wherein the positioning unit calculates an initial position based on the pseudo range calculated by the receiving unit, calculates the pseudo range to the positioning satellite at plural positions around the initial position using the three-dimensional map data and the ray-tracing method, selects candidate positions from the plural positions based on the pseudo range, and decides the current position based on the candidate positions within such a short distance from the initial position that predetermined conditions are satisfied.

23. The position detection device according to claim 22, wherein the plural positions are lattice points of a mesh set around the initial position,
the positioning unit sets the mesh, sets the lattice points as search points, calculates the pseudo range from each of the search points to each the positioning satellite, as a search point pseudo range including a NLOS reflected path delay distance estimated by the three-dimensional map data and the ray-tracing method, calculates a reference position based on the search point pseudo range, and selects, as the candidate positions, the search points of which distance between the reference position and the initial position is equal to a threshold or less.

24. The position detection device according to claim 23, wherein the positioning unit sets the mesh around the selected candidate position, and repeats setting the search points, calculating the search point pseudo range, calculating the reference position, and selecting the candidate positions.

25. The position detection device according to claim 22, wherein, when the number of the candidate position selected is less than a predetermined number, the positioning unit decides the candidate position of the shortest distance from the initial position as the current position, and, when the number of the candidate position selected is equal to the predetermined number or more, the positioning unit selects again the candidate position of the distance from the initial position equal to the threshold or less, and decides the current position by calculating an average weighted with an inverse of the distance from the initial position with regard to the candidate position selected again.

26. The position detection device according to claim 22, wherein the plural positions are positions set randomly around the initial position,
the positioning unit sets the plural positions as search points, calculates the pseudo range from each of the search points to each the positioning satellite, as a search point pseudo range including a NLOS reflected path delay distance estimated by the three-dimensional map data and the ray-tracing method, selects the candidate positions based on the search point pseudo range, adopts a value based on the distance between the candidate position and the initial position as a likelihood, and decides a weighted average corresponding to the likelihood of the candidate position as the current position.

27. The position detection device according to claim 22, wherein the positioning unit calculates the pseudo range from each search point to each the positioning satellite, as a search point pseudo range including a NLOS reflected path delay distance estimated by the three-dimensional map data and the ray-tracing method, and selects, as the candidate positions, the search points of high similarity between a set of the search point pseudo ranges and a set of the pseudo range calculated by the receiving unit.

28. The position detection device according to claim 23, wherein the positioning unit further adds the similarity between a set of the search point pseudo ranges and a set of the pseudo range calculated by the receiving unit to criteria for selecting the candidate positions.

29. The position detection device according to claim 22, wherein the positioning unit has a position calculation part calculating the initial position, a circumference search part searching the plural positions, a candidate position selecting part selecting the candidate positions, and a current position deciding part deciding the current position.

30. The position detection device according to claim 18, wherein the position detection device moves coordinates of a wall surface of a structure in a direction perpendicular to the wall surface, in consideration of a possibility of a position error in the direction perpendicular to the wall surface of the structure included in the three-dimensional map data, searches a position where a residual of least-squares method is small, and estimates that the position is the position of wall surface.

31. The position detection device according to claim 18, wherein, in case that a signal propagation from the positioning satellite goes through a fixed range from edges of a structure included in the three-dimensional map data, the position detection device presumes a case that the signal propagation is LOS and a case that the signal propagation is NLOS, calculates the pseudo range to the positioning satellite in both cases, and selects a likelier one from LOS and NLOS.

32. The position detection device according to claim 18, wherein, in case that a signal propagation from the positioning satellite goes through a fixed range from edges of a structure included in the three-dimensional map data, the position detection device posits an error model on positions of the edges of the structure, and defines a probability that the signal propagation is LOS and a probability that the signal propagation is NLOS.

33. The position detection device according to claim 22, wherein, in case that a residual of least-squares method for calculating the initial position is smaller when presuming that a signal propagation from the positioning satellite is a direct path rather than a reflected path reflected by a structure included in the three-dimensional map data, the position detection device judges that the structure does not exist.

34. The position detection device according to claim 33, wherein, when plural position detection devices judge that the structure does not exist, the judgment is reflected in the three-dimensional map data.

* * * * *